US012253670B2

(12) United States Patent
Chu et al.

(10) Patent No.: US 12,253,670 B2
(45) Date of Patent: Mar. 18, 2025

(54) GHOST IMAGE FREE HEAD-UP DISPLAY

(71) Applicant: Cambridge Enterprise Limited, Cambridge (GB)

(72) Inventors: Daping Chu, Cambridge (GB); Yuanbo Deng, Cambridge (GB)

(73) Assignee: Cambridge Enterprise Limited, Cambridge (GB)

( * ) Notice: Subject to any disclaimer, the term of this patent is extended or adjusted under 35 U.S.C. 154(b) by 71 days.

(21) Appl. No.: 17/771,316

(22) PCT Filed: Oct. 23, 2020

(86) PCT No.: PCT/GB2020/052700
§ 371 (c)(1),
(2) Date: Apr. 22, 2022

(87) PCT Pub. No.: WO2021/079154
PCT Pub. Date: Apr. 29, 2021

(65) Prior Publication Data
US 2022/0390743 A1    Dec. 8, 2022

(30) Foreign Application Priority Data

Oct. 24, 2019 (GB) ........................... 1915455
Oct. 28, 2019 (GB) ........................... 1915608

(51) Int. Cl.
    *G09G 3/00*         (2006.01)
    *G02B 27/01*       (2006.01)
    *G02B 30/33*       (2020.01)

(52) U.S. Cl.
    CPC ......... *G02B 27/0101* (2013.01); *G02B 30/33* (2020.01); *G09G 3/002* (2013.01);
(Continued)

(58) Field of Classification Search
    CPC ................ G02B 27/0101; G02B 30/33; G02B 2027/011; G02B 2027/012;
(Continued)

(56) References Cited

U.S. PATENT DOCUMENTS 9,019,175 B2 * 4/2015 Lu ....................... G02B 27/0172
                                                     345/9
2017/0212352 A1 * 7/2017 Cobb ................. G02B 27/0179
(Continued)

FOREIGN PATENT DOCUMENTS

CN        208721892 U     4/2019
JP         S623225429 A   10/1987
(Continued)

OTHER PUBLICATIONS

Machine Translation (English) of CN110794580A, Qiang (Year: 2020).*
(Continued)

*Primary Examiner* — Bryan Earles
(74) *Attorney, Agent, or Firm* — Meunier Carlin & Curfman LLC

(57) ABSTRACT

An image generation system for providing a ghost image free head-up display, the system comprising a display screen having a front surface and a back surface, a picture generation unit for projecting an image towards the display screen for reflection towards a predetermined eye box, and a field lens, wherein the picture generation unit is configured to project light through the field lens such that light is incident on the front surface of the display screen forming a first virtual image, wherein a portion of the light is transmitted through the display screen and is incident on the back surface of the display screen forming a second virtual image, wherein the first and second virtual images have an offset, wherein the field lens is configured such that the offset is
(Continued)

below a threshold magnitude and the first and second virtual images are substantially overlaid as viewed from the eye box.

18 Claims, 29 Drawing Sheets

(52) U.S. Cl.
CPC .. *G02B 2027/011* (2013.01); *G02B 2027/012* (2013.01); *G02B 2027/014* (2013.01); *G09G 2320/0257* (2013.01); *G09G 2380/10* (2013.01)

(58) Field of Classification Search
CPC .......... G02B 2027/014; G02B 27/0172; G02B 27/0018; G09G 3/002; G09G 2320/0257; G09G 2380/10
See application file for complete search history.

(56) References Cited

U.S. PATENT DOCUMENTS

| | | | | |
|---|---|---|---|---|
| 2017/0357088 | A1* | 12/2017 | Matsuzaki | G02B 6/3516 |
| 2018/0143427 | A1* | 5/2018 | Griffin | G02B 17/086 |
| 2020/0285051 | A1* | 9/2020 | Ma | B60K 35/00 |
| 2021/0191132 | A1* | 6/2021 | Karner | G02B 27/0101 |
| 2021/0373330 | A1* | 12/2021 | Urey | G02B 26/0816 |
| 2022/0058780 | A1* | 2/2022 | Kobayashi | H04N 13/327 |

FOREIGN PATENT DOCUMENTS

| | | |
|---|---|---|
| JP | H11-30764 A | 2/1999 |
| JP | 2019-12190 A | 1/2019 |
| JP | 2019-15939 A | 1/2019 |
| JP | 2019-90896 A | 6/2019 |
| JP | 2019-124371 A | 7/2019 |
| JP | 2019-128389 A | 8/2019 |
| WO | 2019138625 A1 | 7/2019 |
| WO | 2019165921 A1 | 9/2019 |

OTHER PUBLICATIONS

International Search Report and Written Opinion reveived in PCT/GB2020/052700 dated Apr. 29, 2021, 16 pages.
Office Action issued for Chinese Application No. 202080074528.7, dated Dec. 7, 2023.
Second Office Action issued on Aug. 30, 2024, in corresponding Chinese Application No. 202080074528.7.
Communication pursuant to Article 94(3) EPC issued on Jan. 30, 2024, in connection to European Application No. 20800278.2.
Response to Office Action issued in European Application No. 20800278.2, dated Jul. 30, 2024.
Office Action issued for Japanese Application No. 2022-515881, dated Nov. 12, 2024.

* cited by examiner

GHOST IMAGE FREE HEAD-UP DISPLAY

CROSS REFERENCE TO RELATED APPLICATIONS

This application is a United States National Phase Patent Application of International Patent Application Number PCT/GB2020/052700, filed on Oct. 23, 2020, which claims the benefit of priority to GB Application No. 1915455.8, filed Oct. 24, 2019 and GB Application No. 1915608.2, filed Oct. 28, 2019, the contents of which are incorporated by reference herein in their entireties.

TECHNICAL FIELD

The present disclosure relates to a display system. Particularly, but not exclusively, the disclosure relates to apparatus for displaying images on a screen in a ghost image free manner.

BACKGROUND

Heads-up displays (HUDs) are known displays where images are projected onto a transparent surface, such as a windscreen or visor. Such displays are well known in a number of different environments including in vehicles.

Within the automotive industry, most commercial HUDs utilize a separate optical screen (combiner-type HUDs), or display directly onto the windshield (windscreen-type HUDs).

Combiner-type HUDs can be installed in most types of cars without a great deal of modifications. They utilize a transparent plastic projector screen to combine the real driving environment and the projected virtual image. Whilst relatively cheap to install, the plastic screen will partially obscure the view of the driver, and furthermore its performance is poor when the unit experiences vibrations.

Windscreen-type HUDs utilize a vehicle's windscreen to combine a virtual image and real environment. As the windscreen has a finite thickness (typically much greater than the screens used in combiner-type HUDs), the projected image will be reflected both at the front and the back surface of the windscreen, resulting in a primary image and an secondary offset 'ghost' image. The term ghost image is used in the art, and throughout the specification to describe the secondary offset image. In order to negate this effect, a special film can be applied to the windscreen that enhances reflection at the front surface (thereby reducing subsequent reflection at the back surface and diminishing the ghost image). Whilst relatively low cost, such films can be visually unappealing, adversely affect image quality and can decreased in effectiveness following long-term exposure to sunlight. Another solution is to provide a special multi-layer, wedged windscreen which effectively overlap the two reflected images, such that the driver is presented with single, clear image. A schematic of a wedged windscreen is shown in FIG. 1. These specially produced windscreens must be designed especially for each application, and are expensive to build.

An alternative approach is to engineer windscreen with one or more layers of emissive/scattering nanoparticles. Each layer will generate a visible emission at one of R/G/B waveband when excited by a scanning laser projector. By overlaying the images of multiple wavebands, a coloured image is displayed on the windshield. This so-called full windscreen HUD has an unlimited viewing angle, unlimited display site and no laser speckle, but are again expensive and complicated to produce. Further, as the driver has to focus on the windscreen in order to view the displayed information, multi-depth images (i.e. images having elements at different apparent depths) cannot be experienced.

A further difficulty arises when designing HUDs for applications in which the windscreen has a large tilting angle, such as those found in trains and lorries. For small cars, the tilting angle of the windscreen is usually between 30° and 45° and the HUD system is installed just beneath the dashboard, making it easier to design the HUD system. For larger vehicles however, the tilting angles of windscreens can vary over a while range. For example, most train windscreens have a tilting angle from 60° to 80. As for trucks and buses, the tilting angle can be even higher-up to 90°. Not only does the larger tilting angle, in combination with the thicker windscreens used in larger vehicles, make the ghost image problem more prominent by increasing the offset of the images reflected from the front and back surface of the windscreen, it also increases the cost of the conventional mitigation techniques discussed above.

As such the existing methods do not allow for the reduction of ghost images across multiple different systems.

An object of the present invention is to mitigate some of the deficiencies of the prior art mentioned above.

SUMMARY OF THE INVENTION

Aspects and embodiments of the invention provide apparatus as claimed in the appended claims.

According to a first aspect of the invention there is provided an image generation system for providing a ghost image free head-up display, the system comprising a display screen having a front surface and a back surface, a picture generation unit for projecting an image towards the display screen for reflection towards a predetermined eye box, and a field lens, wherein the picture generation unit is configured to project light through the field lens such that light is incident on the front surface of the display screen forming a first virtual image, wherein a portion of the light is transmitted through the display screen and is incident on the back surface of the display screen forming a second virtual image, wherein the first and second virtual images have an offset, wherein the field lens is configured such that the offset is below a threshold magnitude and the first and second virtual images are substantially overlaid as viewed from the eye box.

This approach allows for ghost image free projection without the need for any modification to the display screen surface or internal structure. Furthermore, this technique is applicable to display screen with a wide range of tilting angles up to 90°.

Optionally, the picture generation unit and the field lens are configured such that the light incident on the front surface of the display screen is collimated.

Optionally, the first virtual image is projected onto a first virtual image plane at a first projection distance from the eye box and the second virtual image is projected onto a second virtual image plane at a second projection distance from the eye box.

Optionally, the field lens is configured to project the first and second virtual images at the first and second projection distances such that the offset between the first and second virtual image is below a threshold angular resolution.

Optionally, the threshold angular resolution is equal to the dimensions of a pixel.

Optionally, the threshold angular resolution is equal to the angular resolution of the human eye. By reducing the offset below the limits of the display and/or the human eye's ability to resolve, the ghost image is effectively eliminated.

Optionally, the first and second virtual images are offset in a plane perpendicular to optical axis.

Optionally, the field lens is provided by one of a concave mirror, a free-form surface, a Fresnel lens, a waveguide, a diffractive optical element, a holographic optical element or one or more tapered optical fibers. Tapered optical fibers in particular allow for lensless magnification of the projected image fiberspace, thereby shortening the optical path of the light and allowing the overall spatial footprint of the system to be reduced.

Optionally, the picture generation unit comprises a light source and a spatial light modulator.

Optionally, the picture generation unit comprises a projector and a diffuser for realising the projected image.

Optionally, the picture generation unit comprises a laser and a 2D scanning mirror.

Optionally, the picture generation unit comprises a holographic unit to produce computer generated holograms and a diffuser for realising the holograms.

Optionally, the picture generation unit comprises one or more of an LCD device, an LED device, a micro LED device, a OLED device or a digital light processing digital micromirror device. Such devices are capable of being activated by the application of current, which can be localised and modulated as desired. They can further provide a flexible, multi-colour display Optionally, the system further comprises intervening optics between the picture generation unit and the field lens and/or the filed lens and the display screen.

Optionally, the intervening optics comprise one of a fold mirror, cylindrical mirror, cylindrical lens, waveguide, diffractive optical element or holographic optical element. Such intervening optics allow the path of the light to be arranged around the physical confines of the installation environment, as well as compensating for any optical effects of the windscreen itself.

Optionally, the system further comprises an image processor in communication with the light-field display, wherein the image processor is configured to account for distortions caused by the optical set up such that the image perceived by the observer appears undistorted. This obviates the need for any post-image generation corrections as well as bulky correction optics. Furthermore, it provides a higher degree of flexibility which can adapt to different display surfaces and optical setups.

Optionally, the screen of the head-up display is the windscreen of the vehicle.

Optionally, the first and second virtual images relate to a first image of a stereoscopic pair of images. This enables a user to view an object or scene from multiple perspectives depending on which of the overlaying images they focus.

Optionally, one or more of the field lens, projection unit and/or intervening optical components (if present) are moveable relative to one another.

Optionally, the first and second virtual images are multi-dimensional images. The projection of 3-dimensional images through the HUD system enables such images to be displayed with the appropriate varying depth so as to produce a convincing representation of a real object.

Optionally, the first and second virtual image comprise a subset of images, wherein each image of the subset is realised at a different distance from the focal length of the field lens such that when projected onto the display screen, each image of the subset has a different apparent depth as viewed from the eye box.

Optionally, the system further comprises a light sensitive device arranged to capture light reflected by the display screen through the field lens. This allows the system to act as a camera which may be used to monitor the environment and/or a user within said environment.

According to a second aspect of the invention there is provided a method for providing a ghost image free head-up display, the method comprising generating an image at a picture generation unit, said image to be rendered on a display screen for reflection towards a predetermined eye box, the display screen having a front surface and a back surface, providing a field lens between the picture generation unit and the display screen, wherein a portion of the light incident on the front surface of the display screen is reflected forming a first virtual image, and a portion of the light is transmitted through the display screen and is incident on the back surface forming a second virtual image offset from the first virtual image, and configuring the field lens such that the offset is below a threshold magnitude and the first and second virtual images are substantially overlaid as viewed from the eye box.

Other aspects of the invention will be apparent from the appended claim set.

BRIEF DESCRIPTION OF THE DRAWINGS

One or more embodiments of the invention will now be described, by way of example only, with reference to the accompanying drawings, in which.

DETAILED DESCRIPTION

In an aspect of the invention the apparatus and the display are installed in a vehicle, such as a motor vehicle. Whilst the following description is described with reference to a HUD of a motor vehicle utilising the windscreen as the display screen, the disclosure, and concepts described herein are applicable to other forms of HUD (for example those installed on other forms of vehicles, wearable platforms such as helmets or goggles or other known types of HUDs), as well as displays in general.

In particular, it is envisaged that the invention is installed for use in a confined environment such as a vehicle which can be operated on land (on/off road, or track), under or over sea, in air or space. The examples can be, but not limited to, cars, buses, lorries, excavators, exoskeleton suit for heavy-duty tasks, motorcycles, trains, theme park rides; submarines, ships, boats, yachts, jet-skies and other types of sea vehicles; planes, gliders and other types of air crafts, spaceships and shuttles for space crafts. Furthermore, the technology can be installed/integrated in a mobile platform such as a driver's/operator's head/eye protection apparatus such as a helmet or goggles. Therefore, any activity, which involves in wearing protective helmets/goggles, can utilise the invention described herein. These protective helmets/goggles can be worn, but not limited to, by motorcyclist/cyclist, skiers, astronauts, exoskeleton operators, military personnel, miners, scuba divers and construction workers. Moreover, it can be used in a standalone environment for game consoles, arcade machines and with a combination of an external 2D/3D display it can be used as a simulation platform. Also, it can be used in institutions and museums for educational and entertainment purposes.

Figure 1:
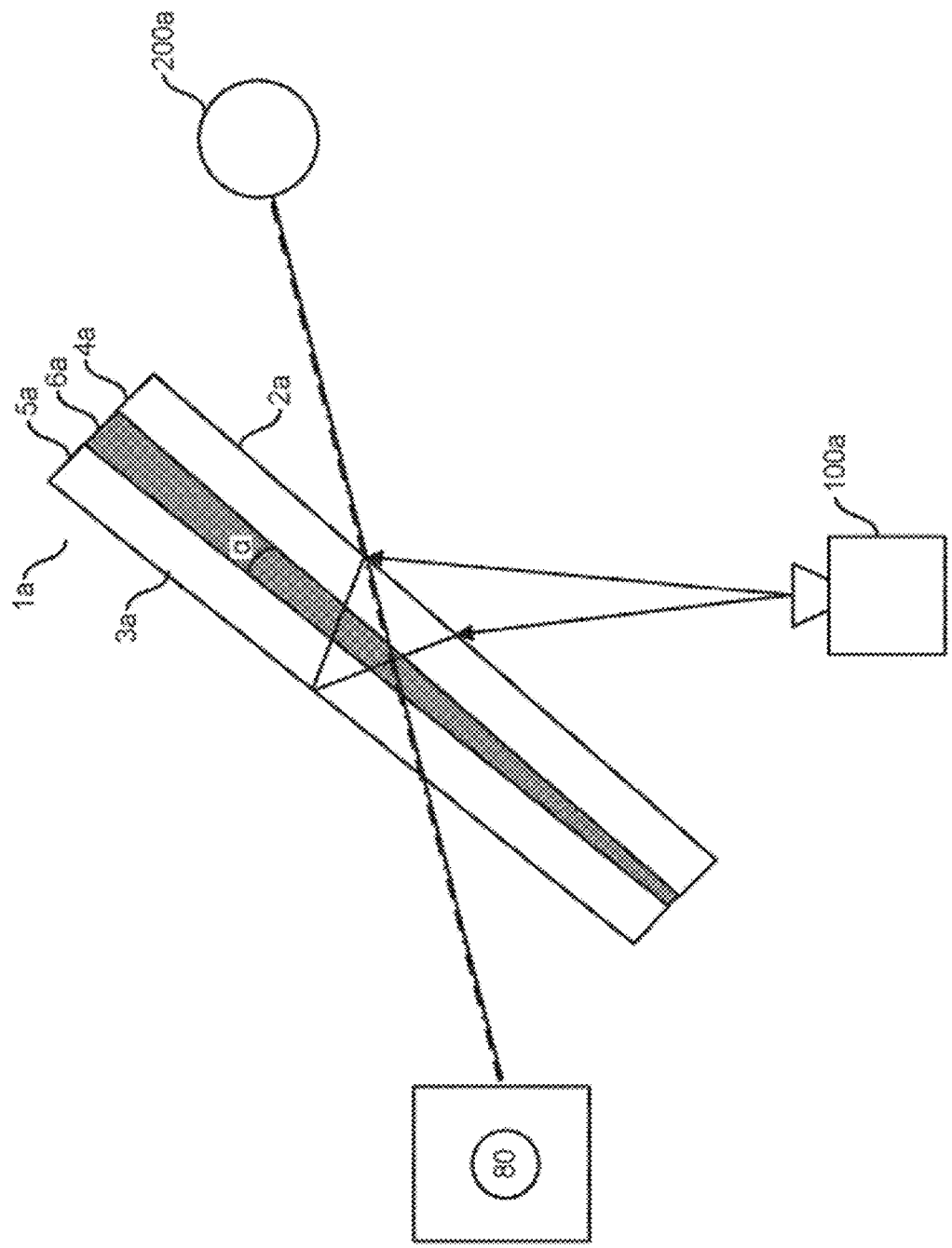
FIG. 1 is a schematic illustration of a known HUD system utilising a wedge windscreen.

FIG. 1 depicts a conventional HUD system using a wedged windscreen.

There is shown a picture generation unit (PGU) 100*a* which projects an image onto the windscreen 1*a*, which is reflected by both the front surface 2*a* and back surface 3*a* of the windscreen 1*a*. The windscreen 1*a* is formed of three layers: a first glass layer 4*a*, a second glass layer 5*a* and an intervening wedged layer 6*a* that biases the first and second glass layers apart at an angle of a. As a result of the wedge layer 6*a*, the front surface 2*a* and back surface 3*a* of the windscreen 1*a* are at different angles to the incident light, such that the image reflected by each surface overlap with one another-and are perceived by the observer 200*a* as a single image, thereby effectively removing any ghost image.

However, wedged windscreens of this type are expensive, difficult to manufacture and install and are generally less flexible and robust than conventional windscreens.

Figure 2:
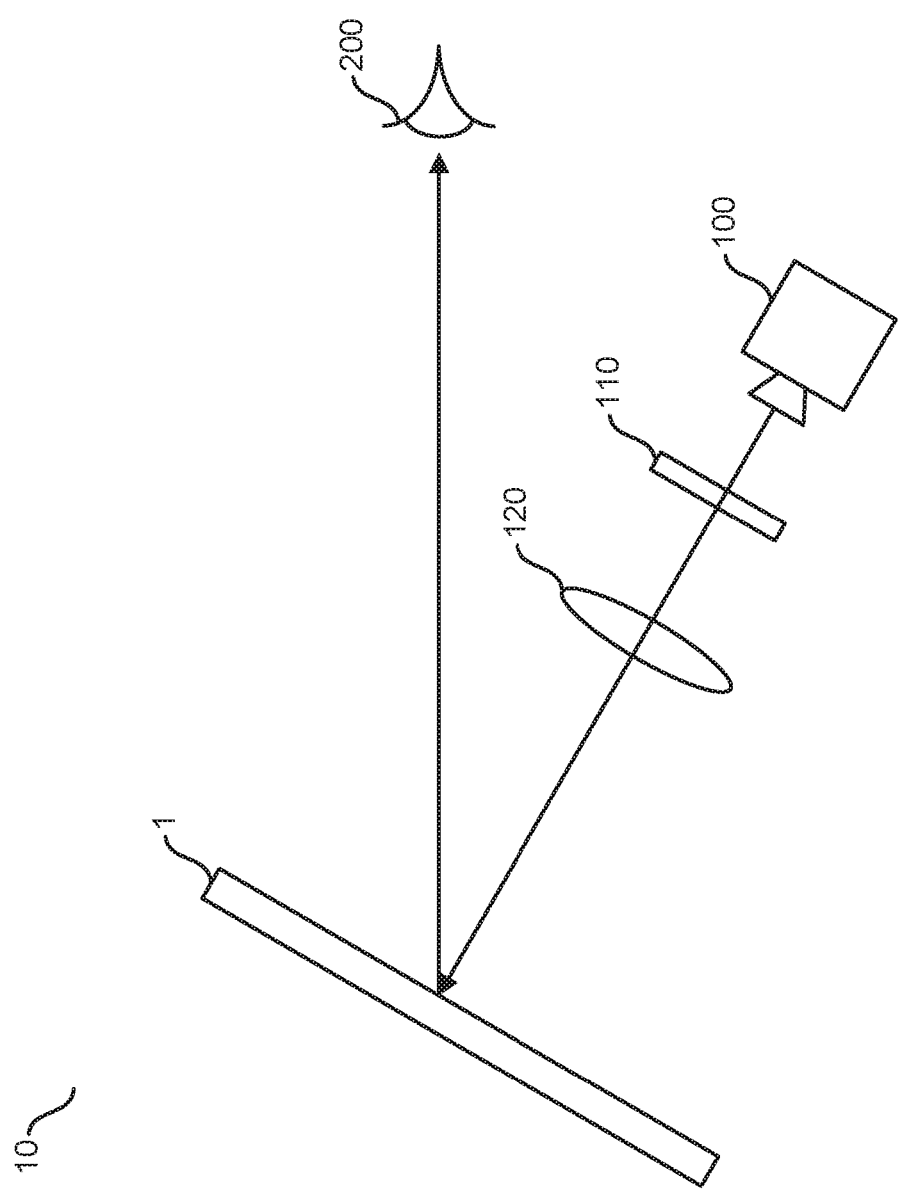
FIG. 2 is a schematic illustration of the HUD system according to an embodiment of the invention.

FIG. 2 shows a HUD system 10 according to an embodiment of the invention.

The HUD system 10 is made up of a PGU 100, a diffuser 110, a field lens 120 and a conventional windscreen 1. The PGU 100 is provided by a projector, though the skilled person would appreciate that any suitable light source and imaging means may be used provided they were capable of operating in the manner described below. Accordingly, in an embodiment the PGU 100 is formed of a laser and 2D scanning mirror, or a holographic unit which produces computer generated holograms for forming on the diffuser 110. In an alternative embodiment, the PGU 100 is a light field unit to produce 3-dimentional light field images for forming on the diffuser 110. A Digital Micromirror Device (DMD), Liquid crystal display (LCD) device, liquid crystal on silicon (LCoS) display, laser projector, light-emitting diode (LED) display, organic light-emitting diode (OLED) display, quantum-dot light-emitting diode (QLED) display and micro-light-emitting diode (µLED) display may also be used in or as the PGU 100. The skilled person would understand that in the DMD, LCoS and LCD embodiments the PGU 100 would further comprise an initial light source. In contrast, a PGU 100 comprising LEDs would not require any further light emitting components. Furthermore, in the DMD, LCoS, LCD or LED, OLED, QLED, µLED embodiments no external image realisation surface is required such that the diffuser 110 is not present.

In an embodiment, the PGU 100 is able to account for any distortion resulting from the transmission of light through components used to manipulate the optical path, such that the final images visible to the user are correctly displayed. In an embodiment, this is achieved by a software-based distortion correction module in (or otherwise in communication with) the PGU 100 that applies a pre-compensating inverse distortion to the image in the digital domain before it is projected. In an embodiment, the distortion correction module calculates the expected distortion from the optical components of the projecting optics and the display and determines the inverse distortion that must be applied such that the final image visible to a user are undistorted. This allows for the PGUs to account for asymmetries in the optical path of each image. Such pre-compensating distortions can be determined by software in a known manner. This obviates the need for any post-image generation corrections as well as bulky correction optics. Furthermore, it provides a higher degree of flexibility which can adapt to different display surfaces and optical setups.

In use, the PGU 100 projects light on to the diffuser 110 to form an image. This image is then projected through the field lens 120 which converges the projected image onto the windscreen 1 where it is reflected towards the observer 200. The skilled person would appreciate that any suitable focussing and magnifying optics may be used, providing they meet the requirements set out below. In an embodiment, the field lens 120 is provided by a Fresnel lens. In an embodiment, the field lens 120 is configured so as to alter the divergent beam from the PGU 100 to a near parallel beam.

The path of the light from the PGU 100 transmitted through the field lens 120 and onto the windscreen 1 is referred to as the optical path. The skilled person would understand that any number of intervening reflectors/lens or other optical components may be placed along the optical path between the PGU 100 and the field lens 120, or between the field lens 120 and the windscreen 1 in order to manipulate the optical path as necessary (for example, to minimize the overall size of the HUD system 10).

An aspect of the present invention is that it allows for a flexible, configurable system, which will result in the reduction of ghost images in a manner which is not installation specific. As described in detail below, by requiring the angular separation between the primary and ghost image is less than the angular resolution of the human eye, and implementing the HUD system accordingly, variations in user height, display angle, size, etc., can be accounted for.

Figure 3B:
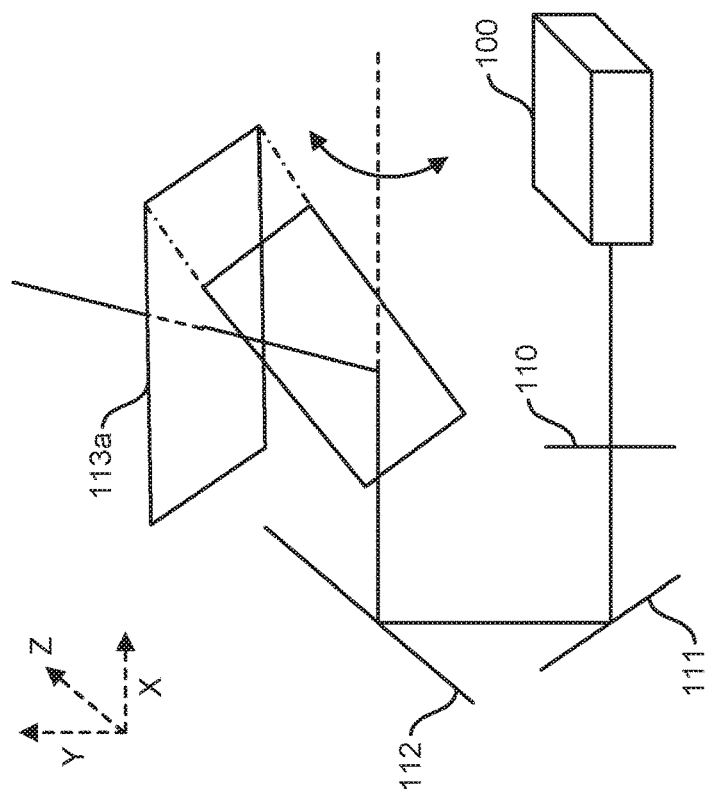
FIG. 3 is a schematic illustration of the HUD system according to an embodiment of the invention.
Figure 3A:
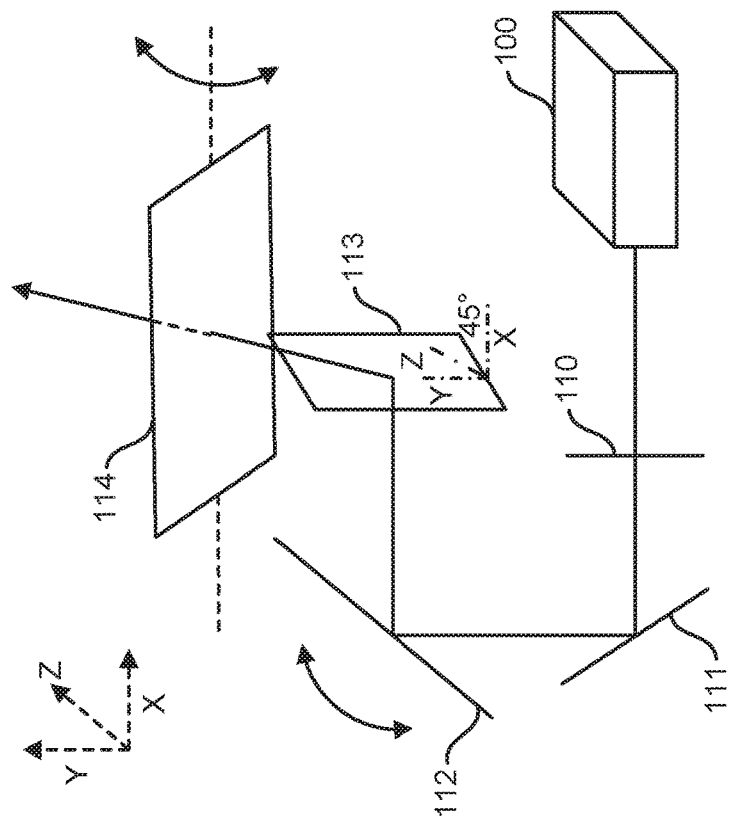
Figure 4:
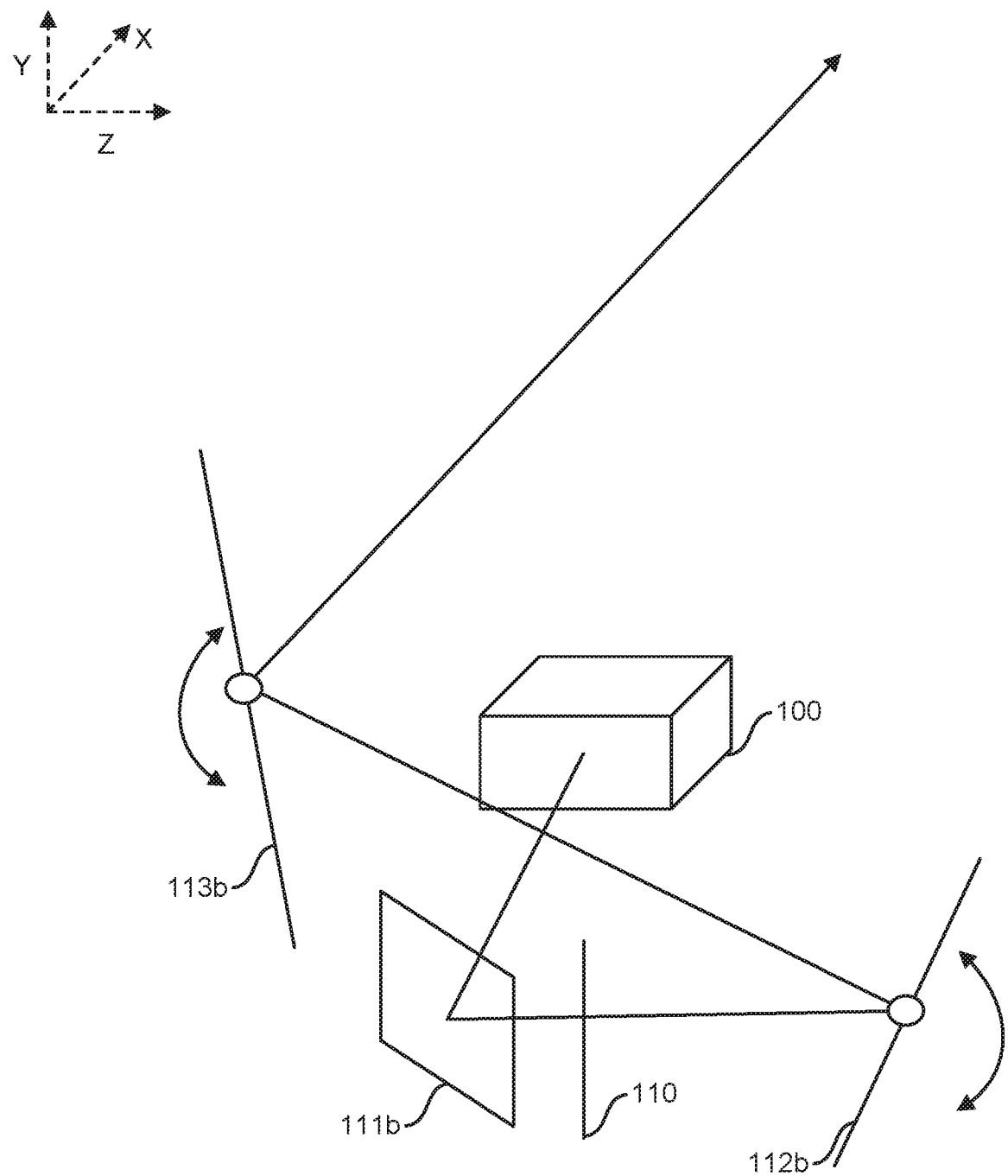
FIG. 4 is a schematic illustration of the HUD system according to an embodiment of the invention.

FIGS. 3, 4 and 5 depict embodiments including such intervening optics, though for convenience neither the field lens 120 nor the windscreen 1 are shown.

FIG. 3(a) shows a HUD system 10 made up of a PGU 100, a diffuser 110, a first, second and third mirror 111, 112, 113, and a field lens 114. As described above in relation to FIG. 2, the PGU 100 may be provided by any suitable image generation means, including those that obviate the need for diffuser 110. The field lens 120 and the windscreen 1 are not shown, but as with the embodiment of FIG. 2, would be located further along the optical path.

In use, the PGU 100 and diffuser 110 (if present) are arranged so to as to project an image onto a mirror 111, which reflects the image onto a mirror 112. Mirror 112 is rotatable about the z axis, as indicated by the curved arrow. The image is in turn reflected onto mirror 113 which redirects the image through the field lens 114.

Beneficially this arrangement is flexible thus allowing the ghost free image to be projected onto a display for multiple different conditions (for example different windscreen thicknesses or tilting angles height of driver etc.). In the present embodiment the PGU 100 and mirror 112 can be adjusted so as to ensure the ghost image free projection.

FIG. 3(b) shows an alternative embodiment of the HUD system 10 made up of a PGU 100, a diffuser 110, a first and second mirror 111, 112, and a field lens 113a. As with the embodiment of FIG. 3(a), any suitable image generation and realisation means may be employed. Once again, the windscreen 1 is not depicted but would be arranged along the optical path as in the case of FIG. 2.

In use, the PGU 100 and diffuser 110 arranged so as to project an image onto mirror 111 and 112 as described above in relation to FIG. 3(a). In this embodiment, mirror 112 is fixed, and is used to redirect the image towards the field lens 113a.

In this embodiment the adjustability of the system comes from the folding mirrors which can be rotated to compensate for differences in the system variables.

All these fold mirrors can be replaced with concave mirror or free form surface, to compensate for imaging distortion or function as a magnifying component, thus reducing the magnification power of the filed lens.

FIG. 4 shows yet another alternative embodiment of the HUD system 10 made up of a PGU 100, a diffuser 110 and a first, second and third mirror 111b, 112b, 113b. As with the embodiments of FIG. 3(a) and 3(b), any suitable image generation and realisation mean may be employed. Whilst the field lens 120 and the windscreen are not depicted, they would be arranged further along the optical path in line with FIG. 2.

In use, the PGU 100 and mirror 111b are arranged to reflect the light from PGU 100 to the diffuser 110, which in turn reflects the image onto mirror 112b and finally mirror 113b. The skilled person would appreciate that the diffuser 110 may be positioned at any point along the optical path before the field lens 120. Both mirror 112b and 113b are rotatable around the x axis so as to precisely control the direction of the projected image as well as adjust for any variations in the system thereby providing the more adjustable system.

Figure 5A:
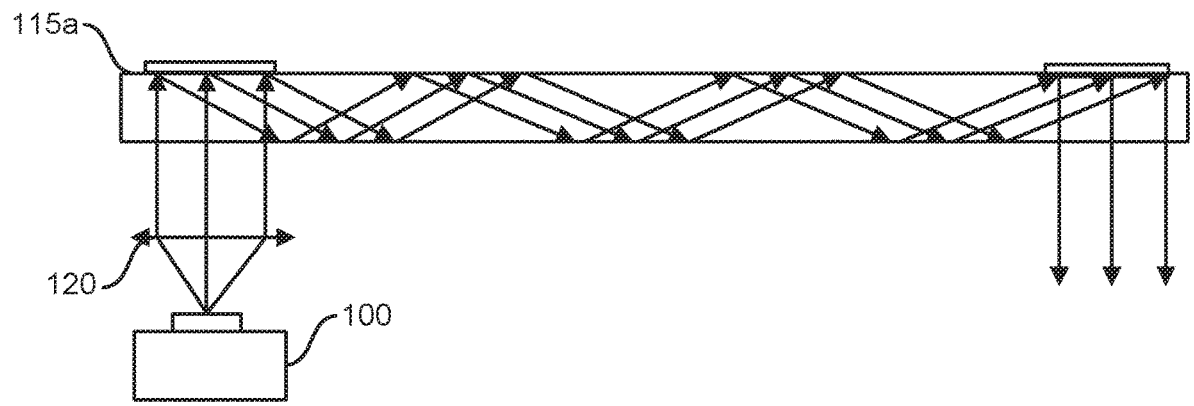
FIG. 5 is a schematic illustration of the HUD system according to an embodiment of the invention.
Figure 5B:
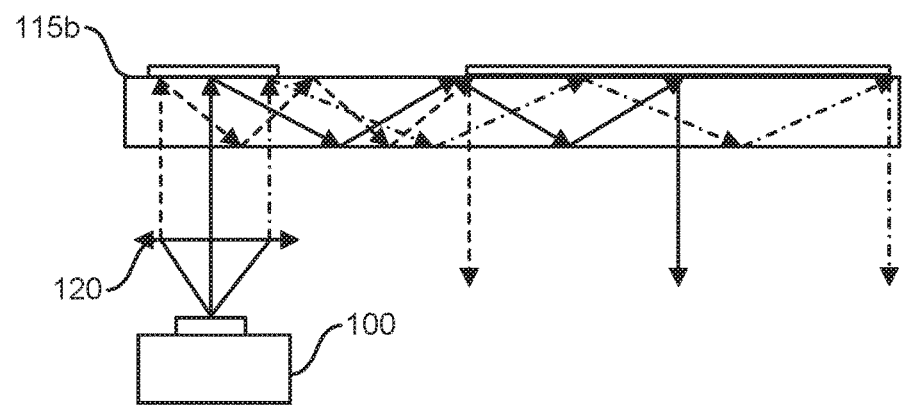

FIG. 5(a) depicts an embodiment in which waveguide 115a is positioned after the field lens 120 and used to redirect light emitted by the PGU 100 towards the windscreen 1 (not shown). FIG. 5(b) depicts an alternative embodiment in which waveguide 115b is used to both redirect and diverge light from the PGU 100 in order to enlarge the image. Though not shown, it is envisaged that the waveguides 115a and 115b would be implemented as part of any of the HUD systems 10 depicted in FIGS. 2-4. In a further embodiment, the waveguides 115a and 115b are replaced with diffractive optical elements (DOE) or holographic optical elements (HOE). The skilled person would understand that any suitably reflective or refractive optical components may be used providing they operate in the manner described.

The arrangement of the inventing optics depicted in FIGS. 3, 4 and 5 enable the HUD system 10 to adapt to windscreens with different thicknesses or tilting angles, or to observers with different heights. This can also be achieved by varying the tilt of the picture generation unit 100 relative to the field lens 120. The area of within which a user's eye must be located in order to see the image reflected by the windscreen 1 is referred to as an eye-box. In each of FIGS. 3-5, it is envisaged that the rotatable mirrors are provided with one or more actuators in communication with control means-thereby allowing their angle of rotation to be changed.

In a further embodiment, additional actuators are provided on each of the mirrors, diffuser 110 and PGU 10 so as vary their relative locations and angular components in each of the x, y and z planes.

In an embodiment, the HUD system 10 is further configured to provide 3D effects via autostereoscopy, in which binocular disparity is used to create the perception of depth.

Figure 6:
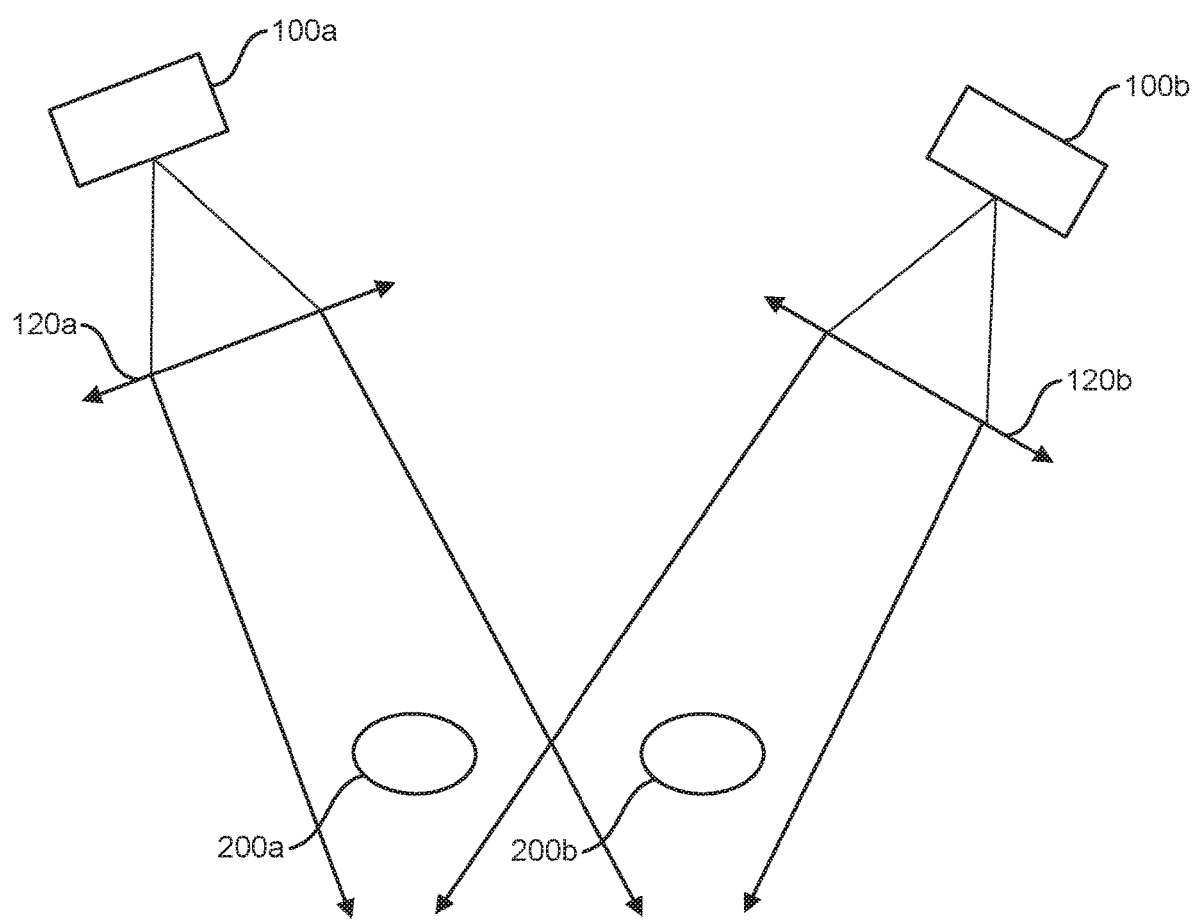
FIG. 6 is a schematic illustration of the HUD system according to an embodiment of the invention.

FIG. 6 depicts an embodiment of the HUD system 10 made up of two PGUs 100a, 100b and a pair of field lenses 120a, 120b. As described above in relation to at least FIG. 2, each of the PGUs 100a, 100b may be provided by any suitable image generation means. For simplicity the diffuser 110, field lens 120 and the windscreen 1 are not shown, but would be located further along the optical path, as with the embodiment of FIG. 2.

In use, each of the PGUs 100a, 100b projects one image of a stereoscopic pair of images towards one of observer's eye 200a, 200b via dedicated field lens 120a, 120b. Accordingly the observer sees two chiefly identical images having a different binocular parallax. For each of the observer's eyes, a ghost-free image is generated based on the principles discussed below.

Figure 7:
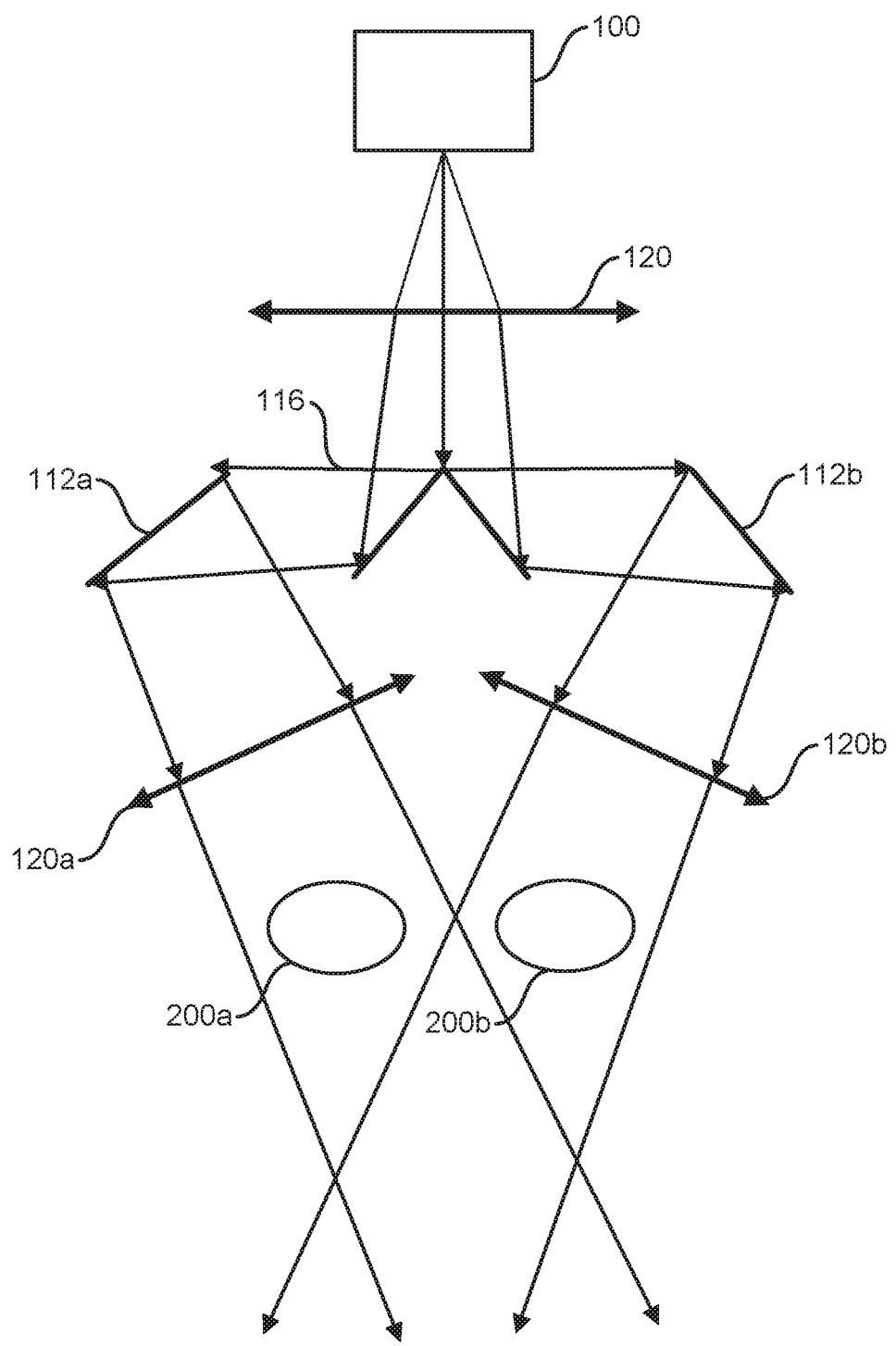
FIG. 7 is a schematic illustration of the HUD system according to an embodiment of the invention.

FIG. 7 depicts an alternative embodiment of the HUD system 10 made up of a PGU 100, a field lens 120, a beam splitting mirror 116, a first and second mirror 112a, 112b and a further pair of field lenses 120a, 120b.

In use, the PGU 100 generates both images of a stereoscopic pair of images by projecting a single image through the field lens 120 and onto the beam splitting mirror 111. An image is then onto towards each of mirrors 112a and 112b and onwards through field lenses 120a and 120b towards the corresponding eyes of the observer 200a, 200b.

The optical system of a HUD can be divided into three parts based on their different functions and logical order: the combiner system, the magnifying system and the intermediate optics. The combiner system defines the overall relationship between the HUD and the installation environment.

Figure 8:
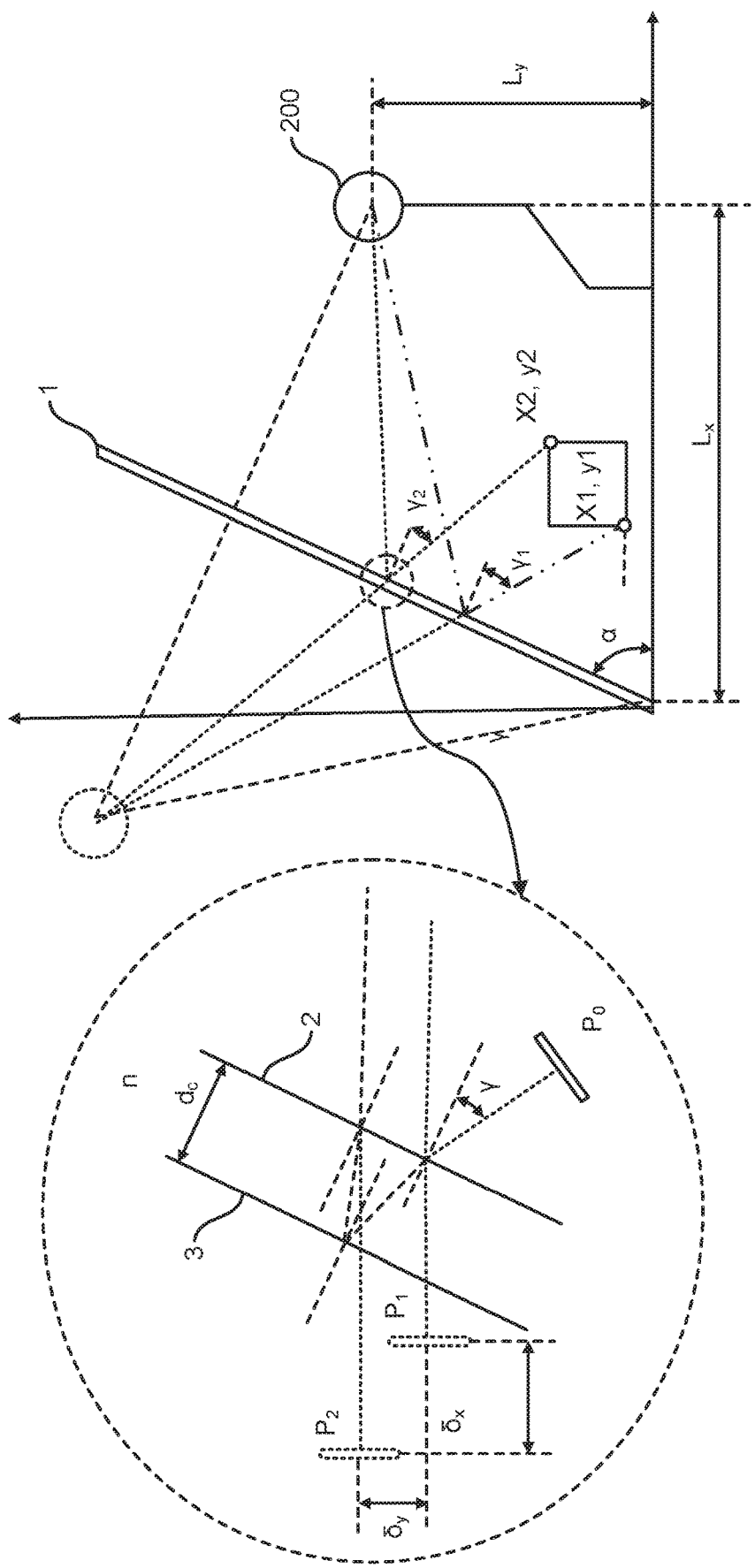
FIG. 8 is a schematic illustration of the HUD system according to an embodiment of the invention.

For example, as shown in FIG. 8, the installation position of the HUD system 10, the incident angle of the light beam out from the HUD to the windscreen 1 and the angle of the light beam being reflected back from the windscreen 1 to the observer/driver 200. Once the geometry of the combiner system has been defined, the magnifying system can be designed to magnify the projected image to a proper size, so that the driver can observe the information comfortably. It is possible to design the magnifying system so that the angular offset between the images reflected from the front 2 and back surface 3 of a windscreen 1 are close to the minimum resolving power of human eyes, thus solving the ghost image issue. As discussed above an advantage of the present invention is that in the event that the geometry of the system is varied the magnifier and/or combiner systems can be adjusted to ensure the ghost free images are produced.

When designing of the magnifying system, there are several important parameters of the HUD that need to be considered, such as the resolution, the Field of View (FoV) and the eye box. After the combiner system and the magnifying system have been defined, the requirements of the intermediate optics system are known, such as the size and position of mirrors and the diffusing angle of the diffuser 110, if used.

The Combiner System

To design the combiner system, one needs to know the requirements of the system and the confinements of the installation environment. An exemplary environment is depicted in FIG. 8.

Figure 9A:
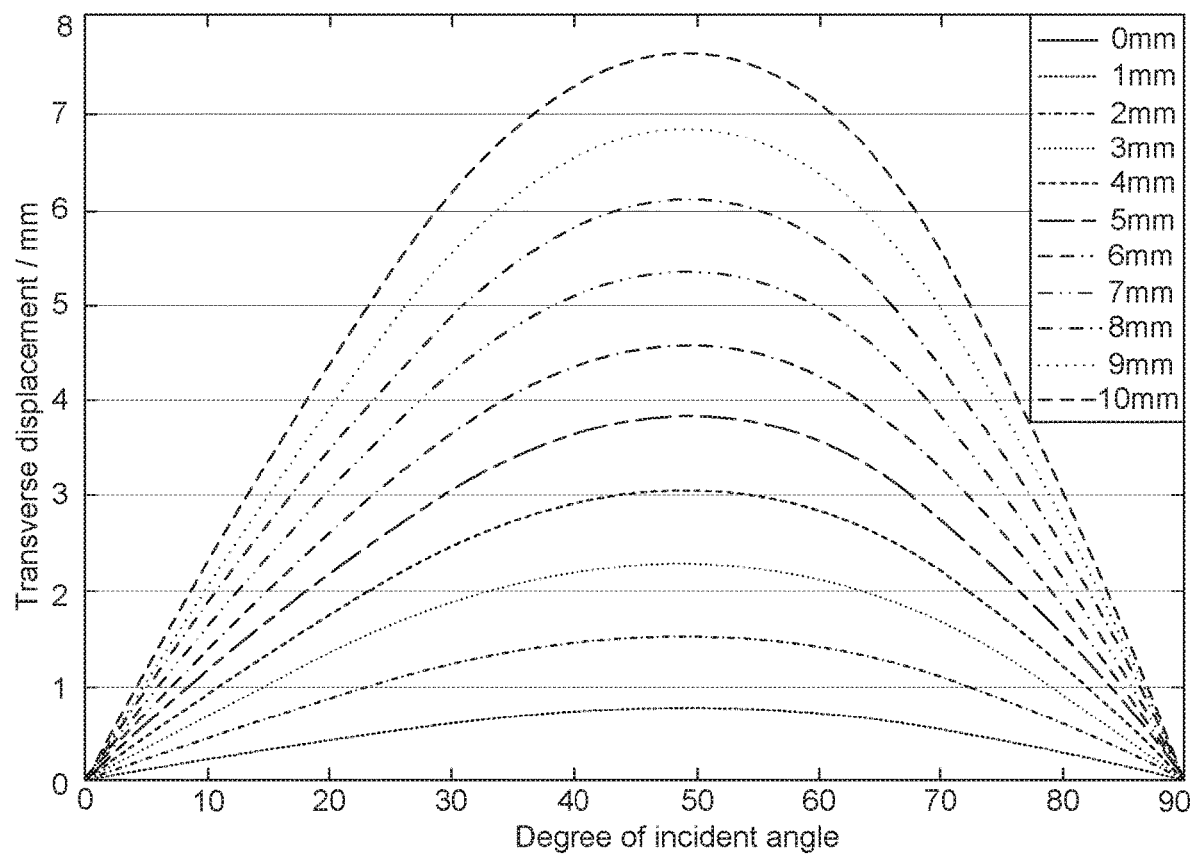
FIG. 9 is a pair of graphs showing relationship between the incident angle and (a) longitudinal displacement and (b) transverse displacement under different thicknesses of the display screen, for given refractive index of the windscreen is 1.5.

FIG. 8 depicts a HUD system 10 that utilizes the windscreen 1 of a vehicle as the combiner device. A PGU 100, diffuser 110 and Field lens 120 (not shown) are located so as to project an image from either of positions $(x_1, y_1)$ or $(x_2, y_2)$. The image $p_0$ is reflected from both the front surface 2 and the back surface 3 of the windscreen 1 towards the observer 200 located at $L_x$, $L_y$-resulting in the generation of a primary image $p_1$ on a first image plane and a ghost image $p_2$ on a second image plane. The windscreen 1 is characterised by several parameters: the refractive index of the windscreen n, the thickness of the windscreen $d_c$ and the tilting angle of the windscreen $\alpha$. These factors define the transverse displacement $\delta_y$ and the longitudinal displacement $\delta_x$ between the primary image reflected by the front surface 2 of the windscreen 1 and the ghost image reflected by the back surface 3 of the windscreen 1. The relationships are given by following equations:

$$\delta_x = \frac{2d_c}{\sqrt{n^2 - \sin^2\gamma}}\left(n - \frac{\sin^2\gamma}{n}\right) \quad (1)$$

$$\delta_y = \frac{2d_c \cos\gamma \sin\gamma}{\sqrt{n^2 - \sin^2\gamma}} \quad (2)$$

where $\gamma$ is the incident angle of the light beam out from the HUD system 10. In practice, the transverse displacement $\delta_y$ is the primary concern, as a driver will only observe the transverse displacement between the primary image and the ghost image. As we can see in Equation (1), $\delta_y$ is affected by n, d, and $\gamma$. A typical refractive index n is usually within a small range from 1.5 to 1.52, if n is taken as n=1.5, it is possible to plot the relationship between the incident angle and the displacement between the double images for a range of windscreen thicknesses, for example, for thicknesses from 0 mm to 10 mm. The results are shown in FIG. 9(a) and 9(b).

Figure 9B:
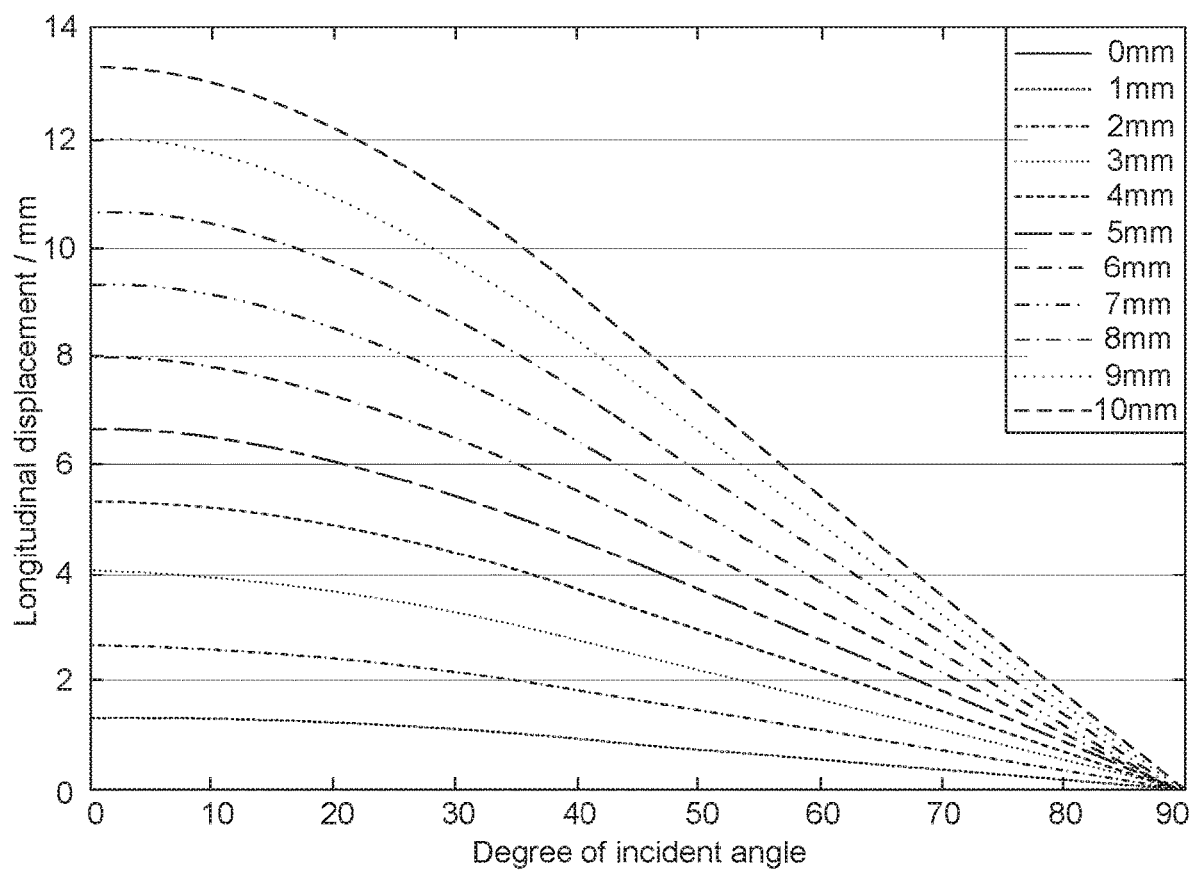

As can be seen from FIG. 9(b), for the same incident angle, as the thickness of the windscreen increases, the transverse displacement increases. From FIG. 9(a) it can be seen that for different thicknesses of the windscreen, as the incident angle increases, $\delta_y$ first increases and reaches its maximum value around 50°, and then decreases until it reaches 0°. In practical situations, $\gamma$ is smaller than 50°, in which case a small incident angle is required in order to reduce or eliminate the longitudinal displacement by.

Figure 10:
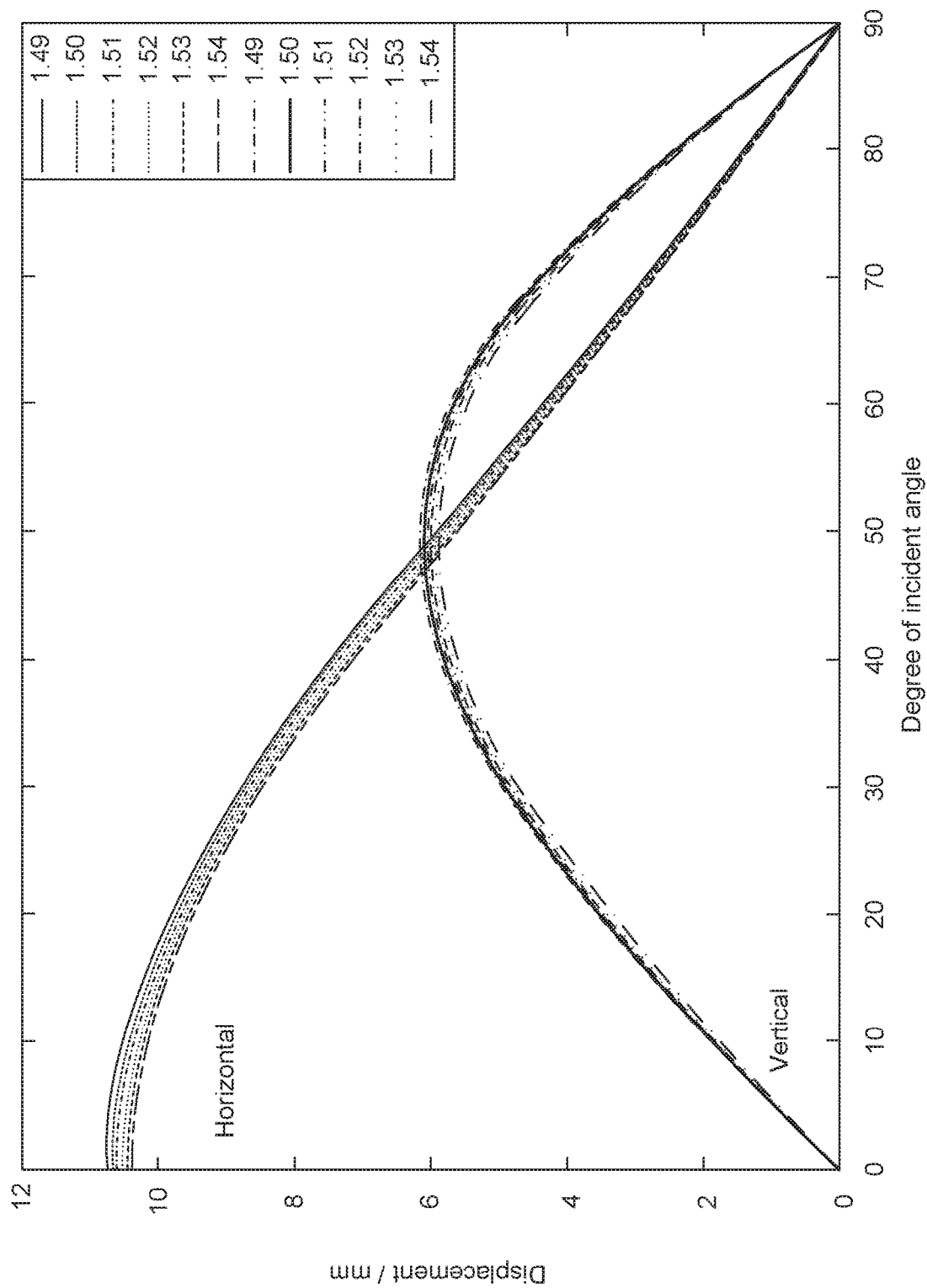
FIG. 10 is a graph showing the longitudinal and transverse displacement of the double images over a range of refractive indexes of the display screen for given windscreen thickness of 8 mm.

FIG. 10 depicts the changes in the transverse and longitudinal displacement with incident angle over a range of refractive indexes between 1.49 and 1.54. This demonstrates that the refractive index doesn't have much impact and is thus a less important factor when designing a HUD system 10.

For a given vehicle model, the refractive index, the thickness of the windscreen 1 and the tilting angle $\alpha$ of the windscreen 1 is set. Meanwhile, the observer's position is usually fixed as well, which means that the value of $L_x$ and $L_y$ are known. Therefore, for given n, $d_c$, $\alpha$, $L_x$ and $L_y$, we can adjust the position of HUD (x,y) to obtain different incident angle following relationship:

$$\gamma = \alpha - 90° + \arctan\frac{\sqrt{L_x^2 + L_y^2}\cos\left(2\alpha - 90° - \arctan\frac{L_y}{L_x}\right) - y}{\sqrt{L_x^2 + L_y^2}\sin\left(2\alpha - 90° - \arctan\frac{L_y}{L_x}\right) + x} \quad (3)$$

From Equation (3), it can be seen that the incident angle to the windscreen 1 is decided by the tilting angle of the windscreen 1 and the position of the observer 200. To reduce the transverse displacement of the double image, one must reduce the degree of the incident angle by increasing the value of y and decreasing the value of x. For example, in FIG. 8, position $(x_2,y_2)$ provides a lower value of $\gamma$ than position $(x_1,y_1)$.

The Magnifying System

Once the installation environment parameters and the position of the HUD system 10 have been decided, a value of $\delta_y$ can be calculated. It is then possible to define the projection distance necessary to achieve ghost image free projection.

The minimum angular resolution human eyes can discern is 0.02 degrees or 0.0003 radians, which means, if $\delta_y$ viewed at the distance between the image and the observer 200 is smaller than 0.0003 radians, the observer 200 will regard the two images as one. The distance between the image and the observer 200 is denoted $d_{ei}$, which allows the condition for removing the ghost image to be written as:

$$\frac{\delta_y}{d_{ei}} < 0.0003 \quad (4)$$

A value of $d_{ei}=\delta y/0.0003$ or more is thus desirable, which can be achieved by modifying the magnifying system.

Figure 11:
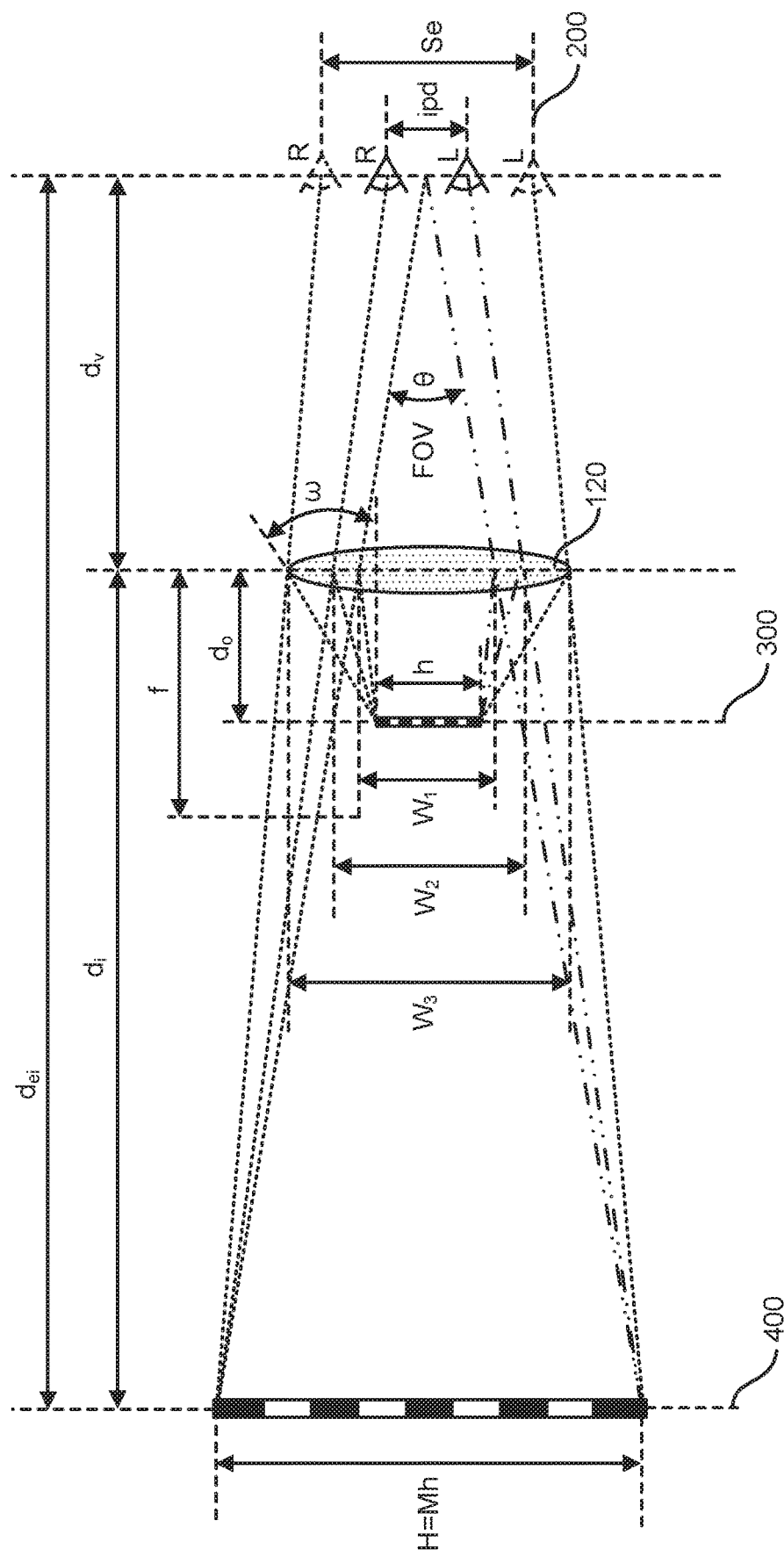
FIG. 11 depicts the operation of a magnifying system according to an embodiment of the invention.

FIG. 11 depicts key features of an abstracted magnifying system. For ease of understanding, FIG. 11 depicts a system having a single field lens 120 with a focal length f. An image of size h is formed on an image plane 300 at a distance $d_o$ from field lens 120 and is transmitted through the lens 120 to form an image of size H on the image plane 400. $d_{ei}$ is the distance between the projected image and the left L and right R eyes of an observer 200, given by Equation (4). The environment installation parameters define the distance between the exit aperture and the observer $d_v$, such that the distance between the virtual image plane 400 and the lens $d_i = d_{ei} - d_v$ is known, as well as the magnification factor M=H/h. The imaging equation can be written as:

$$\frac{1}{d_o} + \frac{1}{-d_i} = \frac{1}{f} \quad (5)$$

As the magnifying system generates a virtual image, the sign before $d_i$ is negative so as to keep $d_i$ positive.

Rearranging Equation (5) gives:

$$d_o = \frac{f d_i}{d_i + f} \quad (6)$$

As $d_i$ is known, $d_o$ changes with f. If a lens is chosen with a longer focal length, then the value of $d_o$ increases as well.

Figure 12:
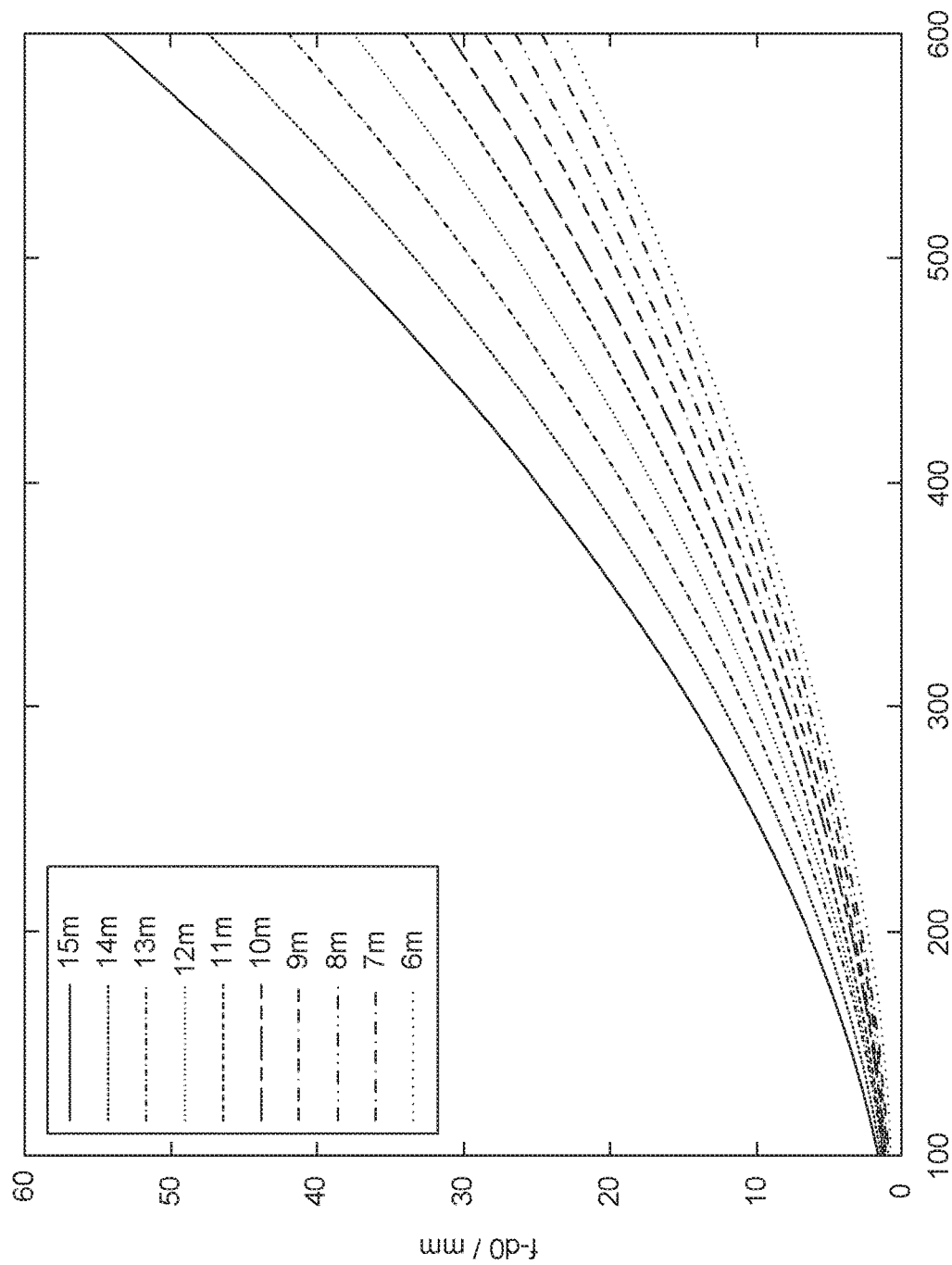
FIG. 12 is a graph showing the relationship between the focal length of the field lens and the distance from the image plane to the focal plane for different projection distances.

When choosing the focal length of the lens, one must also consider the distortion effect. When the image plane is close to the focal plane, one may observe barrel distortion of the target image, which increases as the square of the distance from the centre. One solution to this issue is to choose a lens with larger aperture or longer focal length. For a fixed projection distance, the relation between the focal length and the distance between the image plane and the focal plane is shown in FIG. 12. As can be seen, for given projection distance, a longer focal length provides a larger $f-d_o$ value, which can reduce the distortion. However, longer focal length may increase the overall light path of the system, thus making it bulky. Therefore, one needs to choose a lens with a focal length to balance the image quality and the overall HUD size.

Another important factor for consideration is the aperture of the lens. HUDs have a particular Field of View (FoV) and project an image towards an eye box. FoV is the angular size of the virtual image visible to the observer 200, whilst the eye box is usually defined as a rectangular box, within which the observer 200 moves their head and still can see the virtual image. A larger FoV allows the observer 200 to see a larger image and a larger eye box defines the effective zone wherein the driver can see the HUD contents. The theoretical FoV of the HUD system 10 is decided by the size of the target image and magnification of the lens, while the eye box of the HUD system 10 is decided by the aperture of the lens. The FOV value can be expressed by:

$$\theta = 2 \arctan \frac{f - d_i}{2f} \cdot \frac{h}{d_{ei}} = 2 \arctan \frac{1 - d_i/f}{2} \cdot \frac{h}{d_{ei}} \quad (7)$$

Referring to the model in FIG. 11, three different aperture sizes are considered $W_1$-$W_3$. The minimum aperture size to achieve theoretical FoV, $W_1$, the aperture size that allows both eyes to see the virtual image, $W_2$, and the aperture size that allows the driver to move their head within the eye box-$W_3$. Then are given by the following identities:

$$W_1 = 2d_v \cdot \tan\frac{\theta}{2} \quad (8)$$

$$W_2 = W_1 + \frac{d_{ei} - d_v}{d_{ei}} \cdot ipd \quad (9)$$

$$W_3 = W_1 + \frac{d_{ei} + d_v}{d_{ei}} \cdot S_e \quad (10)$$

where ipd stands for inter pupil distance and $S_e$ stands for the eye box size. In practical applications, $S_e$ is usually larger than ipd, such that $W_3 > W_2 > W_1$, therefore the minimum aperture size of the lens is decided by $W_3$. Once the values of $d_{ei}$ and $d_v$, the required aperture size of the lens is given by Equation (10).

Thus the system requirements are driven and determined by theoretical considerations thus ensuring that the images produced will always be ghost free images.

Intermediate Optics

The previous sections detail the determination of the installation position of the HUD, the corresponding projection distance and the selection of a suitable lens. Intermediate optics are used to further tailor the optical path, and can be used to achieve high efficiency with a small overall system volume. Intermediate optics may include additional lenses, diffusers, mirrors waveguides, diffractive optical elements, holographic optical elements or transparent glass.

The field lens 120 is the main optical element in the system, which directly affects the quality of the projected image. Considering the eye box of the HUD system 10, the aperture size required is usually required to be quite large. Therefore a Fresnel lens is selected as the field lens 120. However, the imaging quality of the Fresnel lens is not as good as a normal optical lens, bringing distortions and aberrations to the projected image. Accordingly, in an embodiment, to optimize the imaging quality, instead of a single Fresnel lens, one may use a lens set to improve the imaging quality.

Another important optical component in an embodiment is the diffuser 110. In traditional HUDs, a PGU 100 such as an LED panel or LCD screen is used as the source of the image, where a diffuser 110 is not necessary. However, one crucial drawback of LED panels and LCD screens is that the brightness and the contrast of the image produced by these kinds of PGU are rather low, making the projected image difficult to be seen during the day. To improve the brightness and contrast of the HUD system 10, one may use a digital micromirror device (DMD) projector as the PGU 100. This requires a diffuser 110 to be placed after the projector to diffuse the light out from the DMD, so that the observer 200 can see the full image.

When choosing the diffuser 110, there are three important factors: the light transmission rate, the diffusion angle and the size. For the light transmission rate, the higher the better. As for the diffusion angle and the size, they are decided by the magnifying system discussed above.

Figure 13:
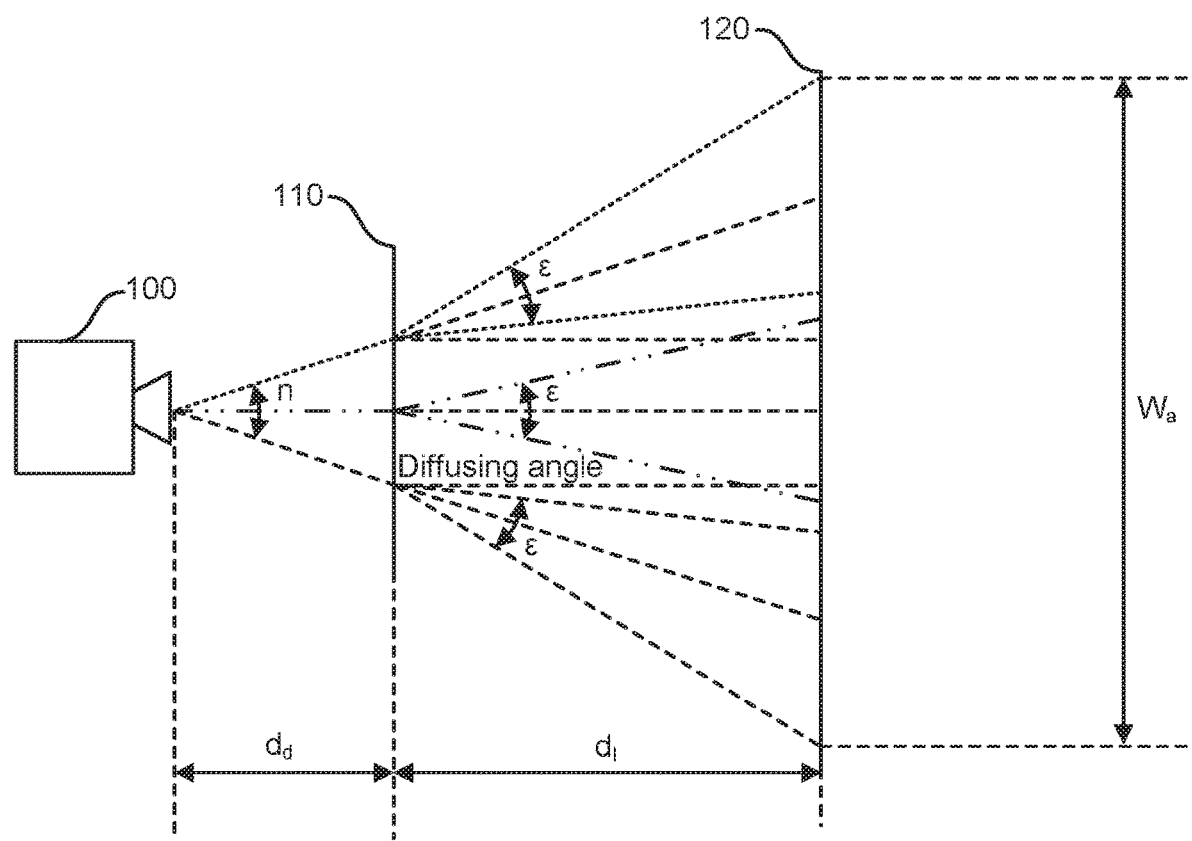
FIG. 13 depicts the operation of a diffuser according to an embodiment of the invention.

FIG. 13 depicts a portion of the HUD system 10 made up of a PGU 100, a diffuser 110 and field lens 120. For simplicity, the diffuser 110 and the field lens 120 are represented by single lines which denote their position and orientation-referred to as the diffuser plane and the lens plane respectively. The diffuser 110 is located at a distance $d_d$ from the PGU 100, and the diffuser 110 and field lens are separated by a distance $d_l$. $W_a$ is the aperture size of the field lens 120.

In use, the PGU 100 projects light onto the diffuser 110 to form an image which is in turn directed through the field lens 120. Accordingly, the diffuser plane is equivalent to the image plane described in the magnifying system shown in FIG. 11.

In FIG. 13, η is the divergent angle of the PGU 100, and ε is the diffusing angle of the diffuser 110. Looking back at FIG. 11, the size of the image is defined as h, which is decided by the magnifying system to meet the FoV and eyebox requirements. To obtain the correct value of h, the distance between the PGU 100 and the diffuser 110 must satisfy the following:

$$h = 2d_d \tan\frac{\eta}{2} \quad (11)$$

and then the size of the diffuser 110 should be larger than h. As for the selection of the diffusing angle, from FIG. 11, one may deduce that:

$$W_a = 2d_l\left(\tan\frac{\eta+\varepsilon}{2} + \tan\frac{\varepsilon}{2}\right) \quad (12)$$

By selecting a small diffusion angle, the effective viewing angle is limited, whereas selecting a large diffusion angle will decrease the light intensity of the display. In addition, the aperture size should be as large as possible to at least achieve the required eye box. Therefore, the diffusing angle should meet the requirement that $W_a < W_3$, so as to achieve maximum light efficiency.

Mirrors are another important optics in the system, which are used to change the light path for reducing the overall system volume or for the convenience of the system design. Once the main structure of the magnifying system has been defined, the sizes and positions of mirrors added into the system can be calculated through the established light path, to ensure that the mirrors don not act as aperture stops and negatively affect the performance of the HUD system 10.

System Setup

Figure 14:
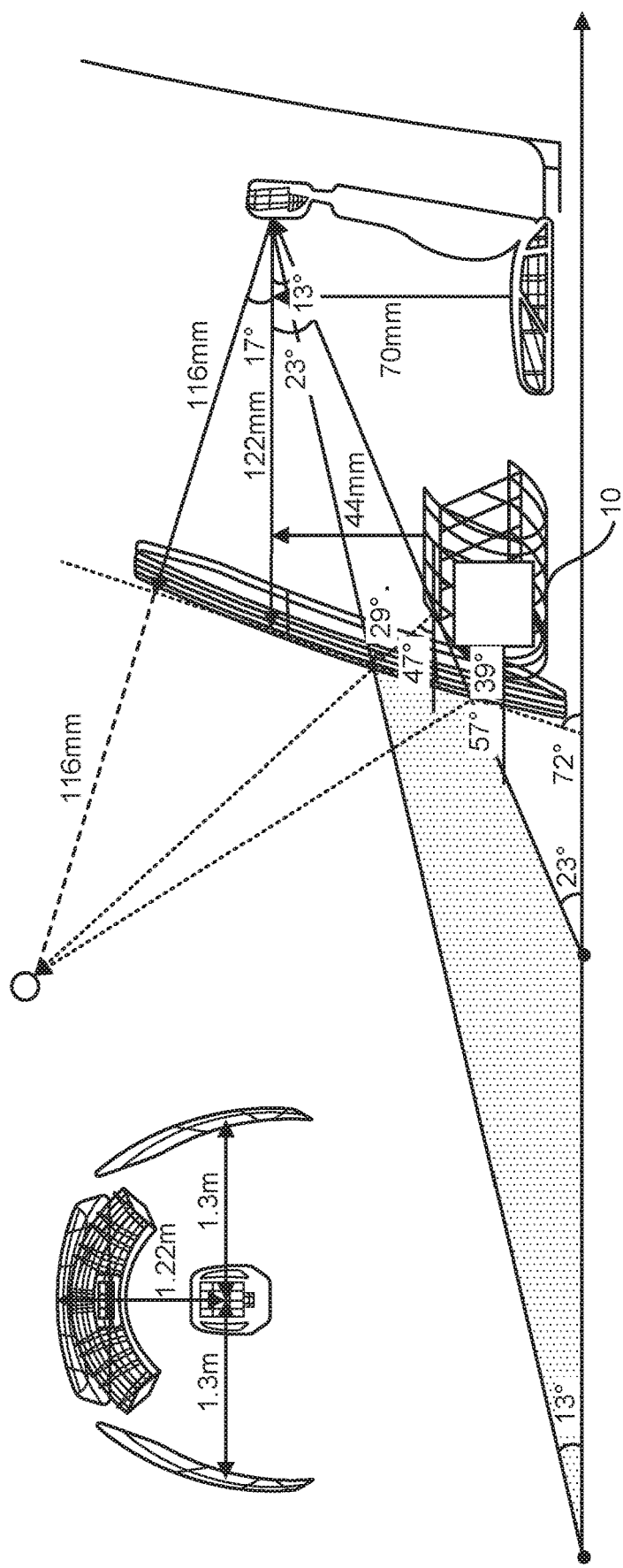
FIG. 14 is a schematic illustration of the HUD system according to an embodiment of the invention.
Figure 15B:
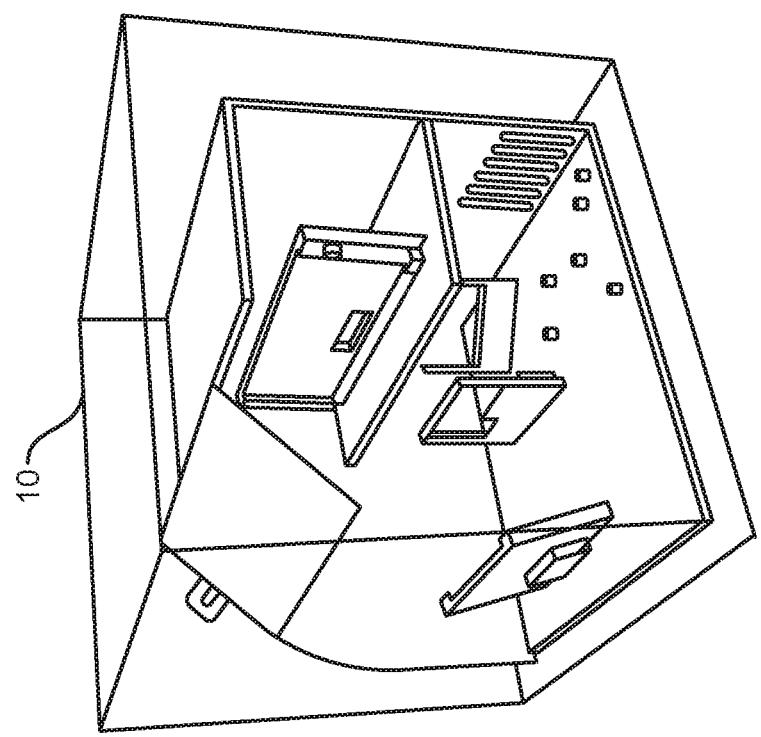
FIG. 15 shows a schematic, 3D model and prototype of the HUD system according to an embodiment of the invention.
Figure 15A:
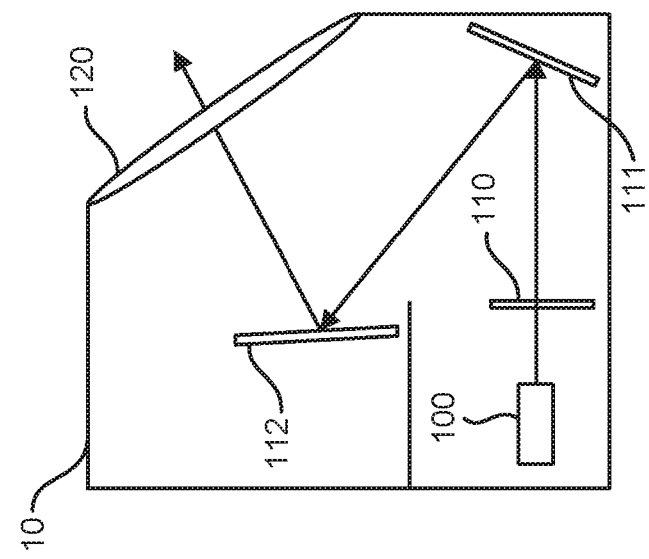
Figure 15D:
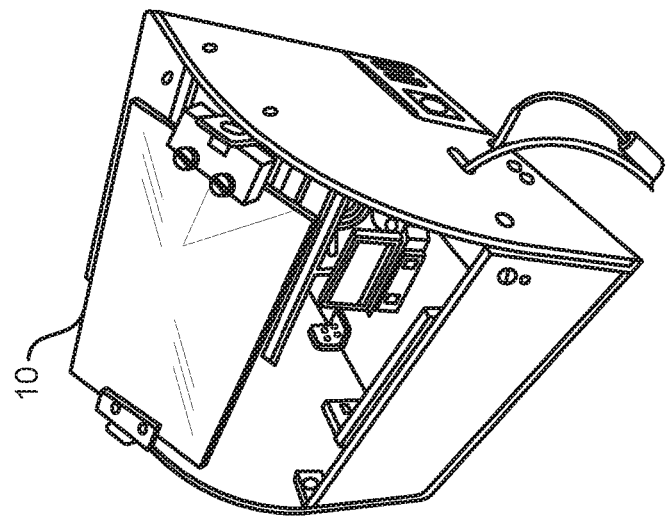
Figure 15C:
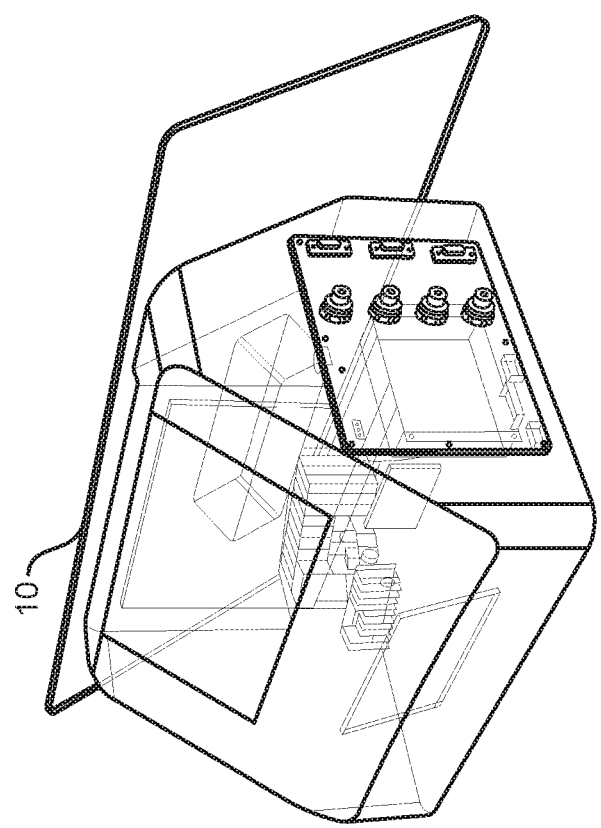

An exemplary installation environment is shown in FIG. 14, with the HUD system 10 being arranged in the same manner as that of FIGS. 2 and 8, with the individual components depicted in FIG. 15(*a*). The tilting angle of the windscreen is 72°, the refractive index of the windscreen is 1.5, and the thickness of the windscreen is 8 mm. $L_x$ is 1.22 m and $L_y$ is 70 mm. The distance between the observer 200 and the Fresnel lens, $d_v$, is around 1.5m. Following the approach set out in the above sections, 29° is selected as the smallest incident angle, allowing the longitudinal displacement of the double image to be calculated as 4.78 mm. The ideal projection distance is therefore around 14 m. In order to achieve a projection distance of 14 meters, a Fresnel lens with a 400 mm focal length and an aperture size of 300 mm by 300 mm. According to Equation (6), the image plane should be located 20 mm away from the focal plane of the Fresnel length. The target FoV is 8° by 4° and the eye box is set at 130 mm by 50 mm. The theoretically required aperture size of the Fresnel lens is thus 344 mm by 172 mm. As such, using a Fresnel lens with an aperture size of 300 mm by 300 mm size, the actual eye box is around 100 mm by 50 mm. For the diffuser 110, a holographic diffuser is selected having a 90% transmission rate and 30° diffusion angle.

To achieve the high projection angle and to reduce the installation size, two mirrors 111, 112 are positioned between the diffuser 110 and the field lens 120 as shown in FIG. 15. FIG. 15 shows the HUD system 10 made up of a PGU 100, a diffuser 110, two mirrors 111, 112 and field lens 120. The system 10 operates in the same manner as described above in relation to at least FIGS. 2-4.

Figure 16:
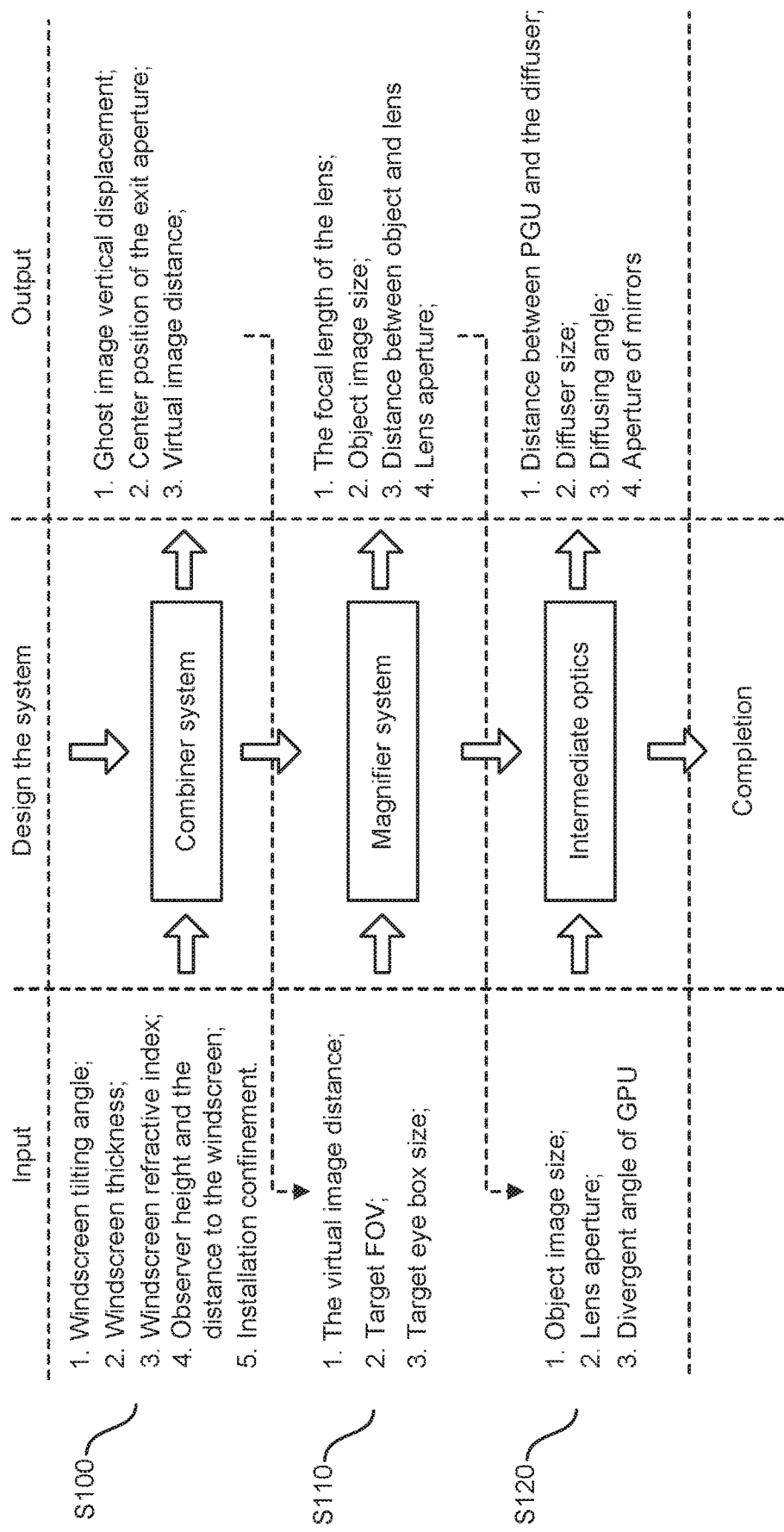
FIG. 16 is a flow diagram showing the steps for designing and implementing the components of a HUD system according to an embodiment of the invention.

FIG. 16 summarises the process for designing a HUD system 10 as described above. At step S100, the environmental conditions are inputted. These include the tilting angle, thickness and refractive index of the windscreen 1, the position of the observer 200 and the available installation volume. These are then used to calculate the longitudinal displacement of the ghost image is calculated along with the virtual image distance.

At step S110, the calculated virtual image distance and the desired FoV and eyebox size are used to define the required focal length of the field lens 120.

At step S120, the outputted characteristics of the field lens 120 and the PGU 100 are used to calculate the necessary position and parameters of the diffuser 110 (if used) as well the aperture of any mirrors employed in the system 10. Thus the outputted parameters are adjusted according to the environmental conditions.

Figure 17A:
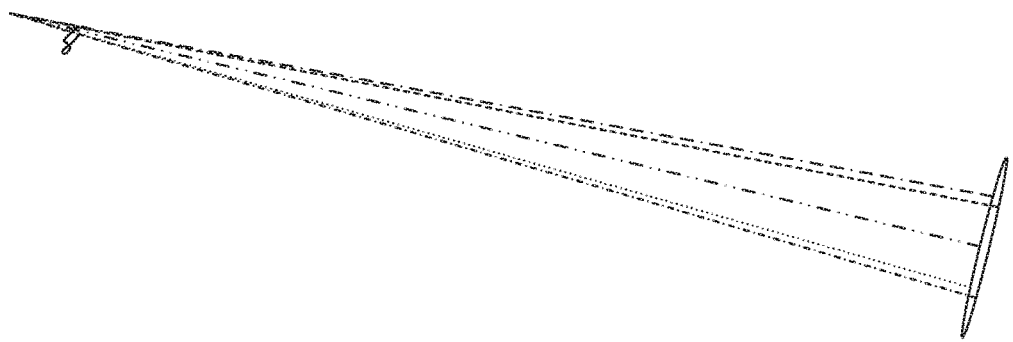
FIG. 17 shows a simulation of the HUD system according to an embodiment of the invention.
Figure 17B:
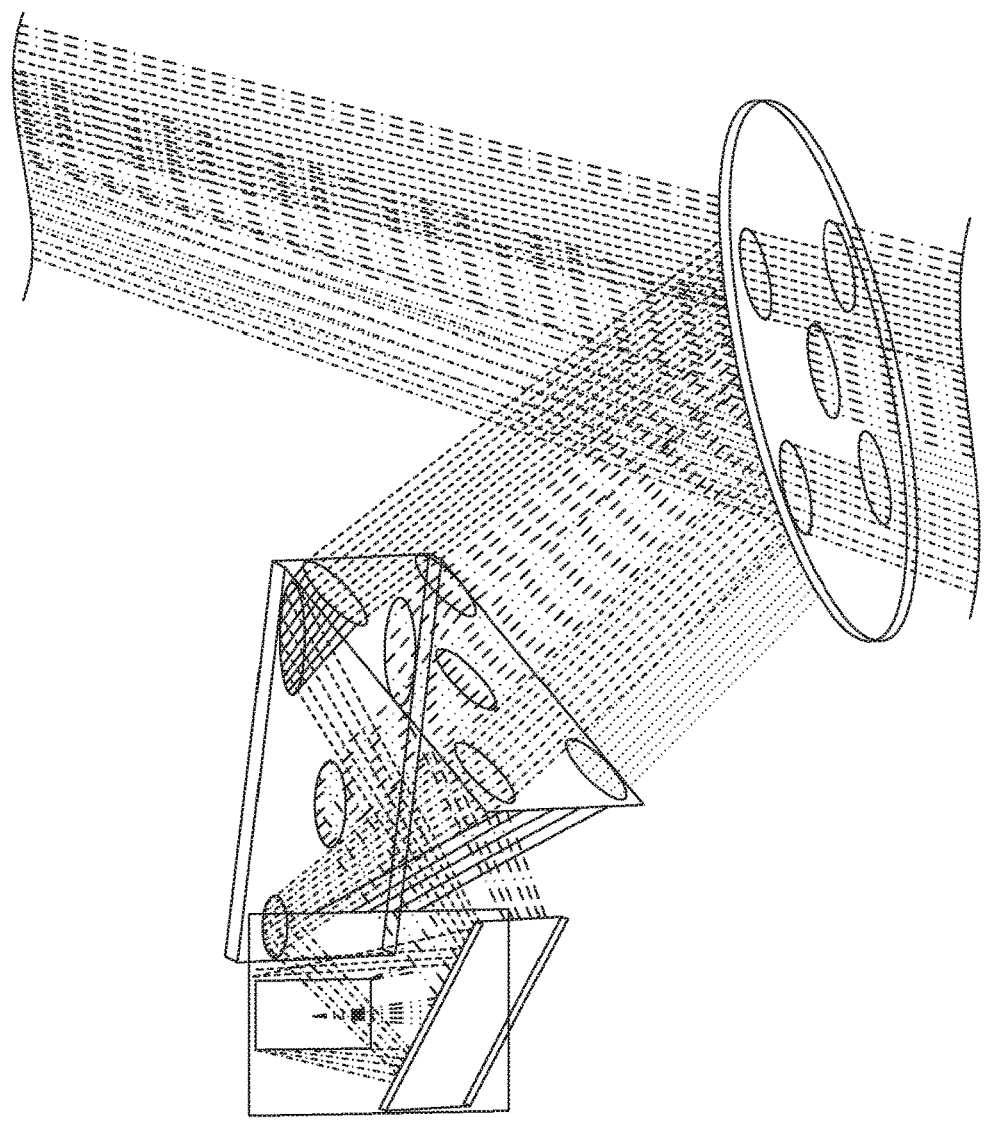
Figure 17C:
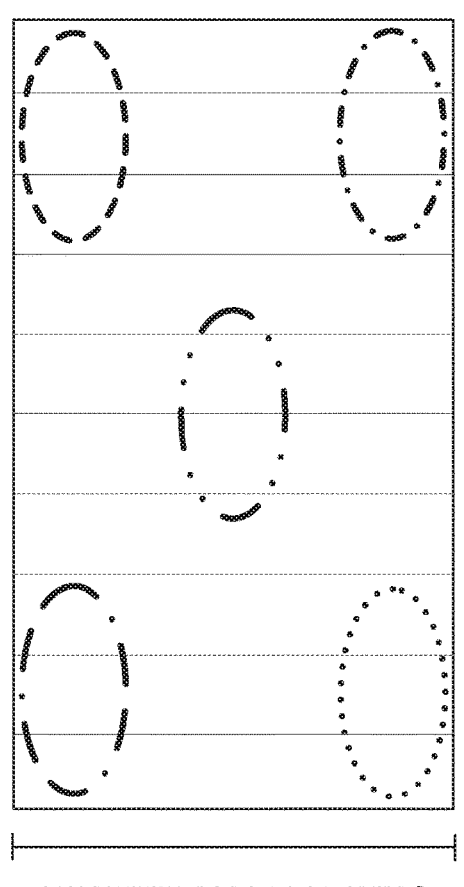

FIGS. 17(*a*) and (*b*) depict a simulation of an embodiment of the invention utilising a PGU 100, diffuser 110, two reflective mirrors 111, 112 and a field lens 120. The simulation is based on a windscreen having a tilting angle of 78° tilting angle, a thickness of 8 mm and a refractive index of 1.5. In this case, the image is projected at distance of 15 m to achieve a ghost-free image.

FIG. 17(*c*) shows the footprint of the projected light on field lens 120 to show there is no vignetting effect if the size of each component is properly set.

Applications Involving Asymmetric or Highly Curved Windscreens

Compared with conventional automotive windscreens, the thicknesses of windscreens used in high speed trains are much higher, as is their curvature. In addition, these windscreens are often significantly more expensive than those for conventional road vehicles. Therefore, it is particularly not economically practical to make a wedged windscreen for high speed trains.

Based on the principle of this invention however, a Ghost image free HUD is provided that requires no modifications to the windscreen.

Figure 18:
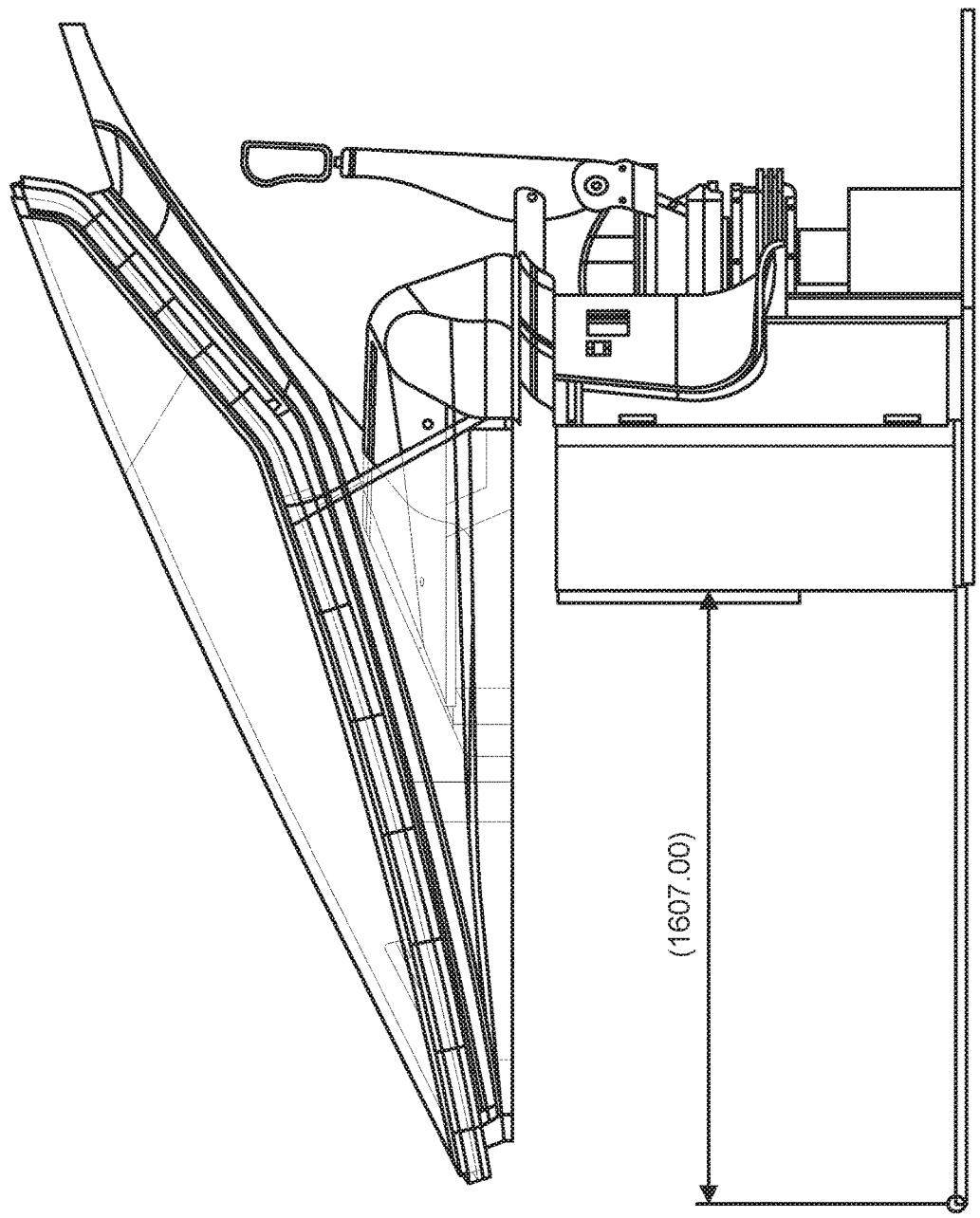
FIG. 18 is a model of the HUD installation environment according to an embodiment of the invention.

A representative model of high speed train cockpit is shown in FIG. 18 and has a windscreen slant angle of 20°, refractive index of the windscreen glass of 1.5, windscreen thickness of 28 mm and a cylindrical profile with a focal length of 714 mm in area of interest (i.e. the area on the internal windscreen surface, to which the image is projected). A typical installation position of the HUD provides an incident angle from the HUD to the windscreen of 59°. According to Equation (1) and Equation (2), in order to achieve ghost image free projection, the projection distance needs to be higher than 66.67 meters. However, to achieve projection of such a long distance, the precision of the optical components would have to be very high and the image size would have to be very large. As a compromise, a target projection distance of 20 meters used.

The design target of the high speed train HUD is thus to project an image to 20 meters away with a field of view of H7°xV4° for an eye box of 130 mm×50 mm. Due to its curvature and thickness, the windscreen will act as an anisotropic optical component, having a different magnifying power along the horizontal direction (the secondary direction) and the vertical direction (the primary direction along which the ghost image is chiefly visible). The rest of the HUD system needs to be designed to accommodate this.

As such, if a single lens is used to project an image to 20 meters away, then the windscreen will perform as a cylindrical mirror to reimage it following an off-axis imaging rule, thus making the final image presented in a very short projection distance (for example, less than one meter) in front of the driver. Accordingly, the curvature of the windscreen must be compensated for by using a further optical component-for example a second anisotropic optical component such as a cylindrical lens or a cylindrical mirror. In an embodiment, the further optical component can be a freeform lens or a freeform mirror for more complicated windscreen profiles.

Figure 19:
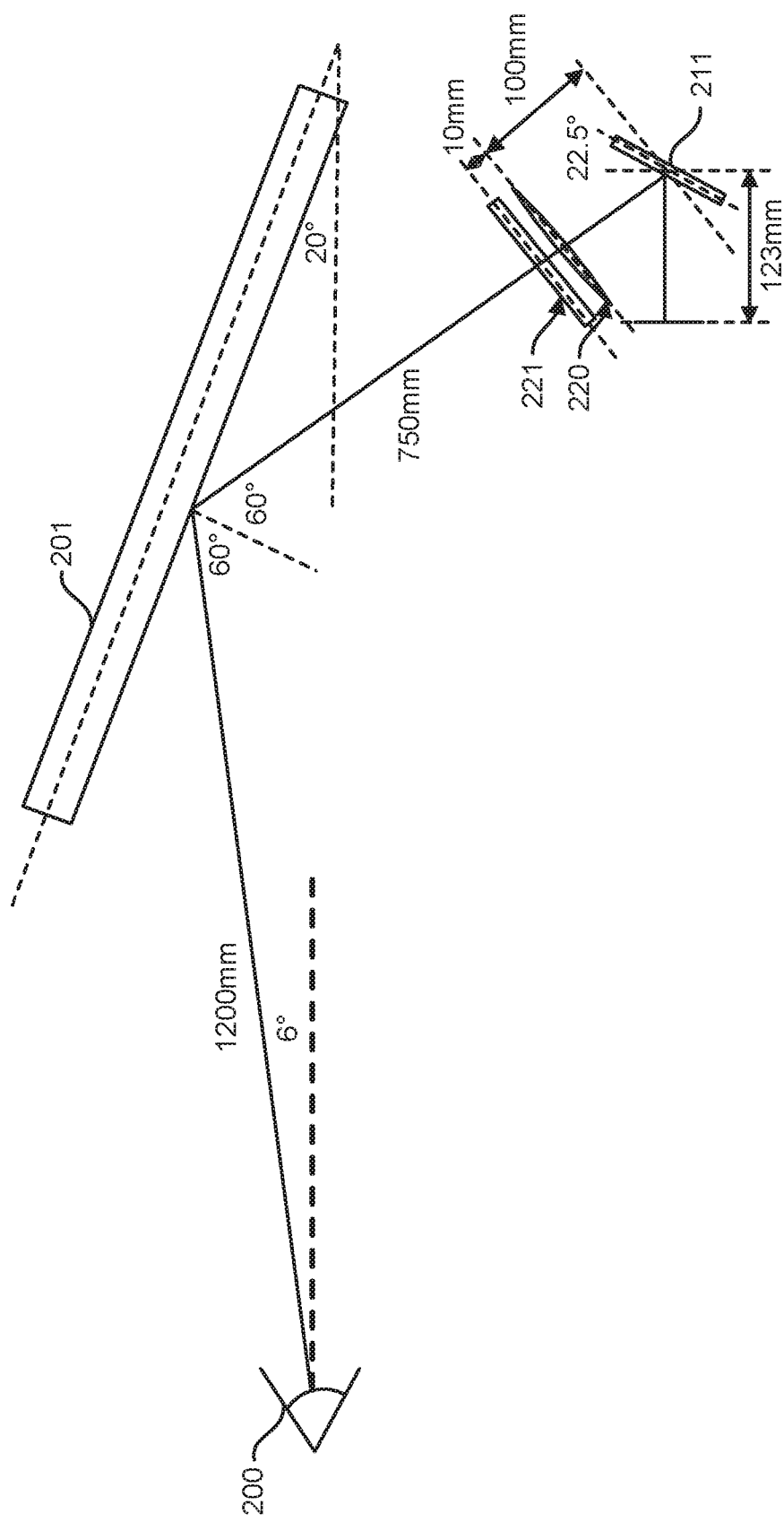
FIG. 19 is a schematic illustration of the HUD system according to an embodiment of the invention.

FIG. 19 depicts an embodiment of HUD system 10 formed by a fold mirror 211, one isotropic field lens 220, and one concave cylindrical lens 221 configured to project an image onto windscreen 201 to be viewed by an observer 200. For simplicity, no picture generation unit or diffuser are shown, however any suitable image generation and realisation mean may be employed.

Figure 20A:
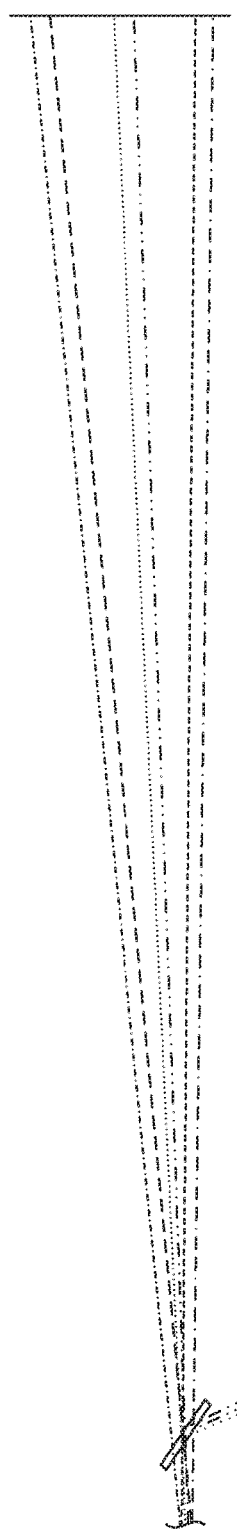
FIG. 20 shows a simulation of the HUD system according to an embodiment of the invention.
Figure 20C:
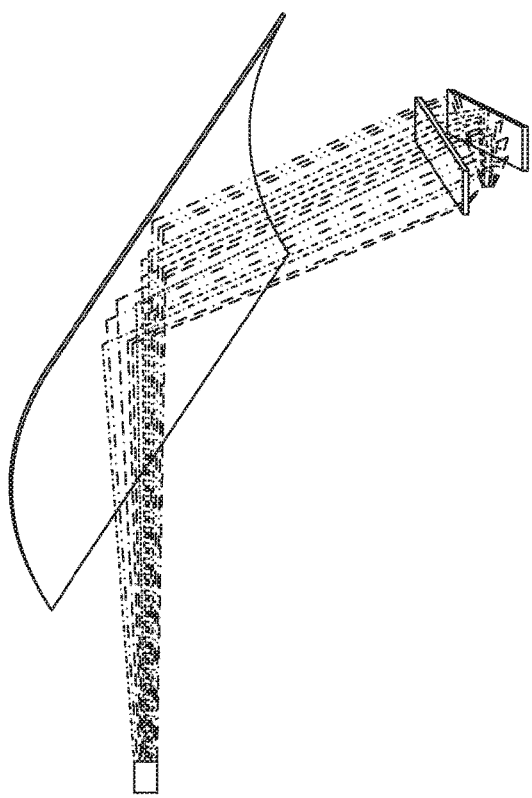
Figure 20B:
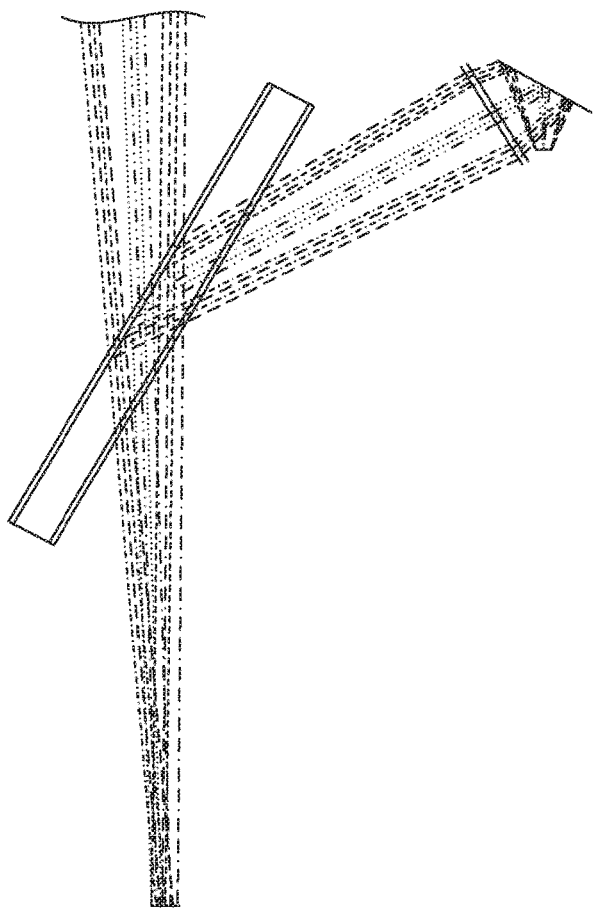
Figure 21A:
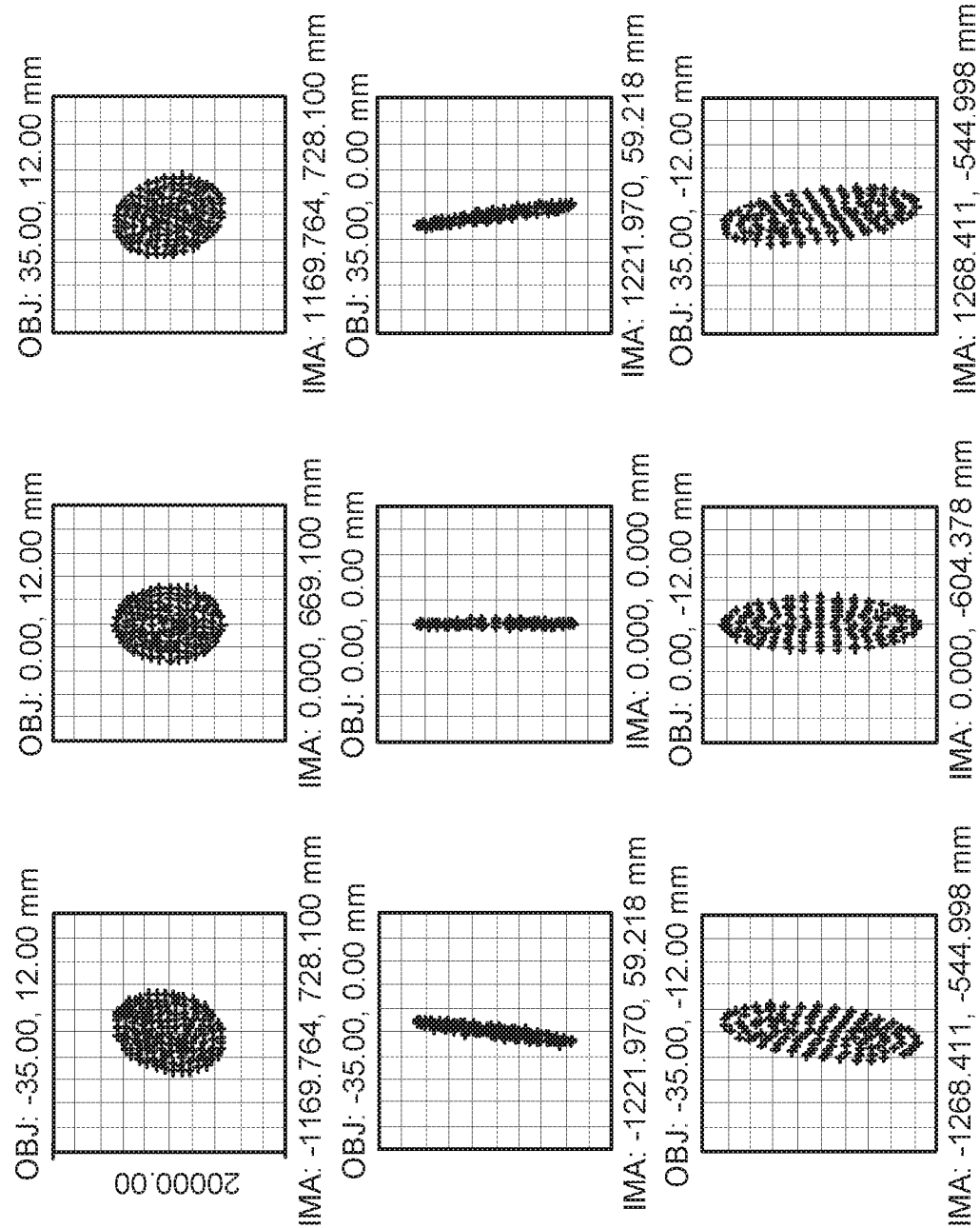
FIG. 21 shows a simulation of the HUD system according to an embodiment of the invention.
Figure 21B:
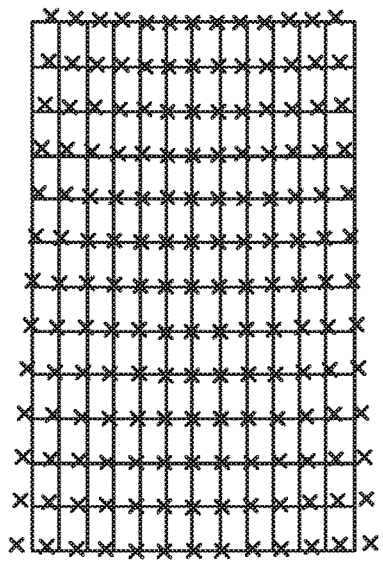

In use, a generated optical object is projected by the PGU and is first imaged by the field lens 220 so that the image is located within one focal length of the windscreen 2011, so that the windscreen 201 then images it to 20 meters away. As the windscreen 201 acts like a cylindrical mirror, it only has magnification power along its power direction, which is the secondary direction that does not impact significantly on the generation of the ghost image (i.e. that of $\delta_x$). Along the primary direction, the image only has an apparent projection distance of 1.5 meters from the observer, thus ghost image free projection has not been achieved. To achieve ghost image free projection, cylindrical lens 221 is used, having an optical power along the primary direction only. The cylindrical lens 221 is placed 10 mm after the normal lens and it is configured such that the final projection distance along the primary direction is 20 meters, so that it matches that of the secondary direction. In conclusion, the image is projected to 20 meters in both the directions. 2D and 3D simulation results of the optical setup shown in FIG. 19 are depicted in FIGS. 20 and 21. FIG. 21(a) is a spots diagram for the full eye box showing nine fields of view of the generated optical object. FIG. 21(b) shows the distortion of the resulting image as a result of the optical components, including windscreen 201.

To further optimize the imaging quality, more optics may be introduced into the system along the optical path as required. In addition, as shown in FIG. 21(b), images viewed by the observer 201 in the above embodiment will appear squeezed along the horizontal direction due to the magnification difference along the horizontal and the vertical viewing directions provided by the illustrated setup. In an embodiment, this is corrected using pre-compensated image generation means in a known manner.

Figure 22:
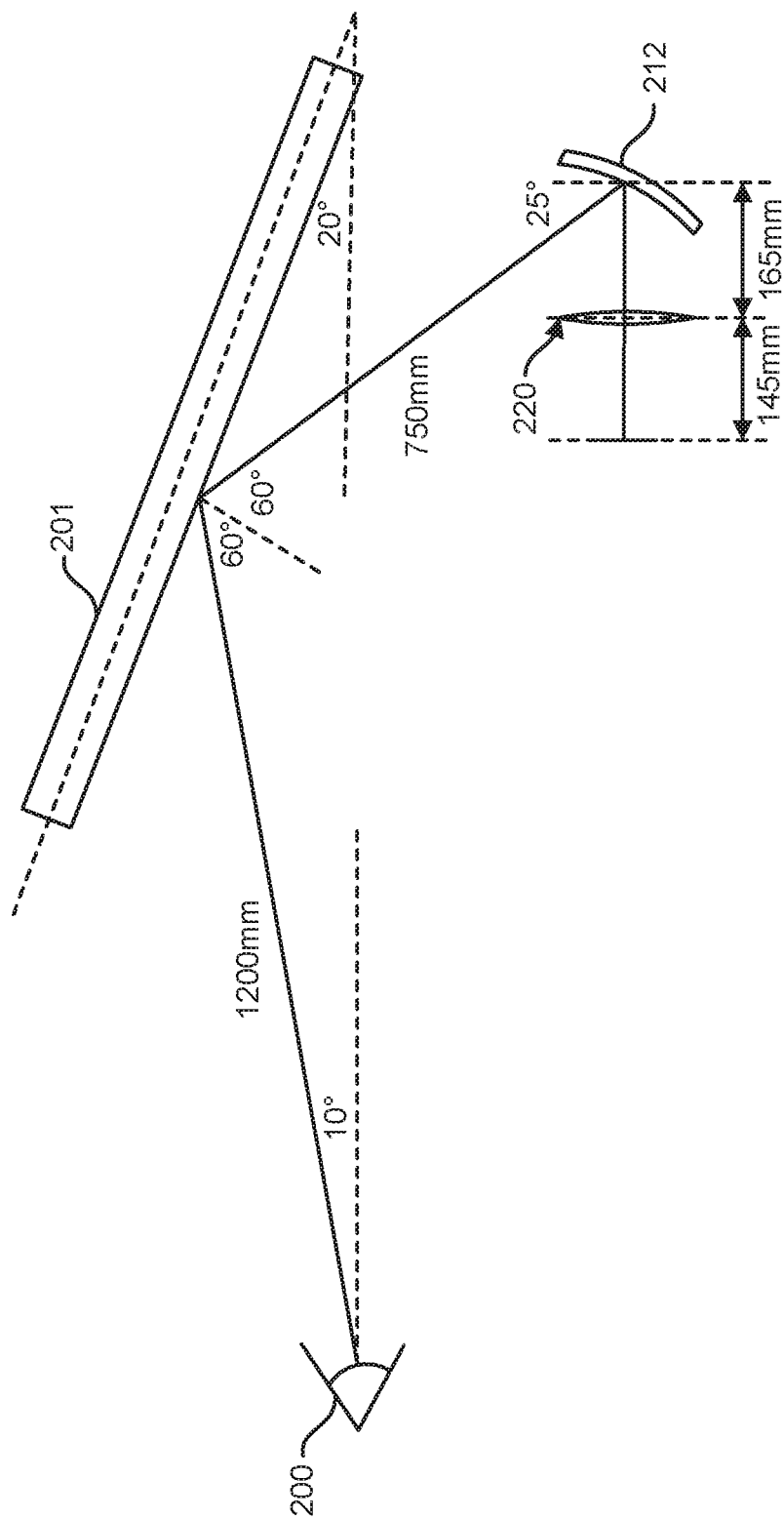
FIG. 22 is a schematic illustration of the HUD system according to an embodiment of the invention.
Figure 23A:
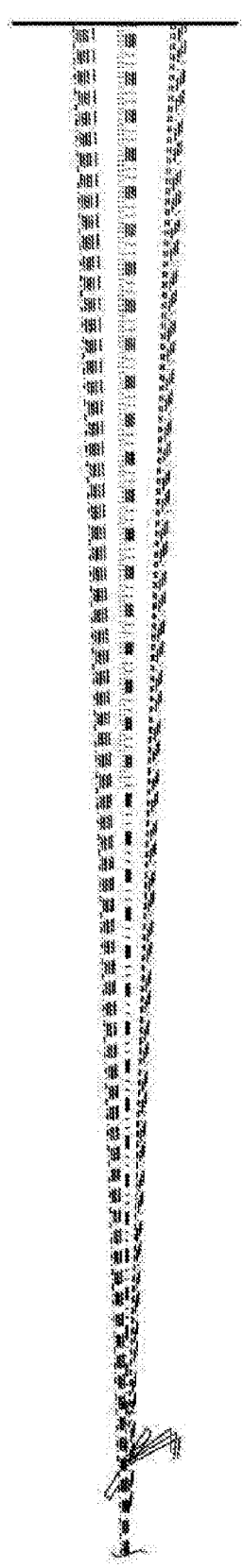
FIG. 23 shows a simulation of the HUD system according to an embodiment of the invention.
Figure 23C:
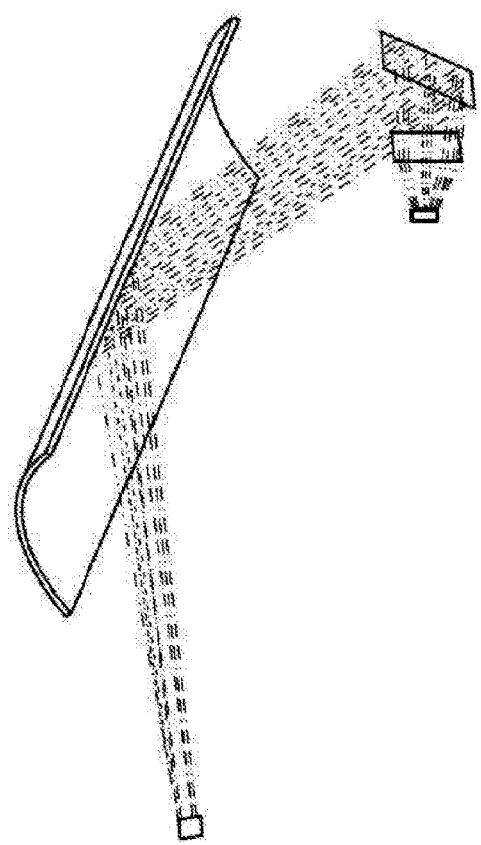
Figure 23B:
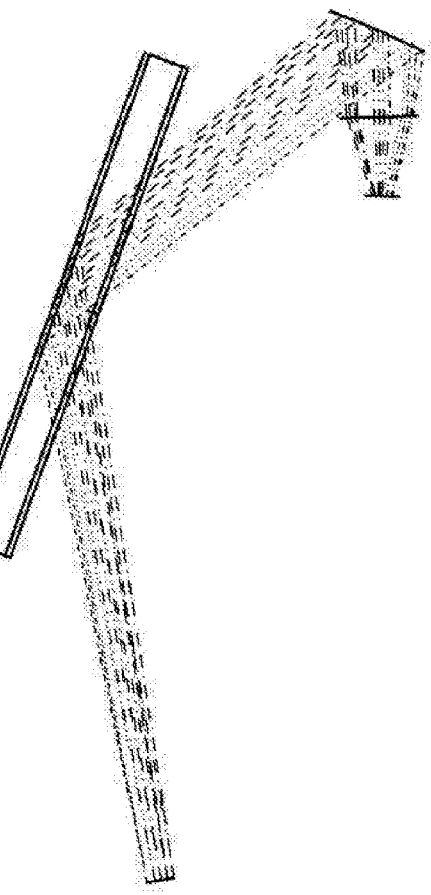
Figure 24A:
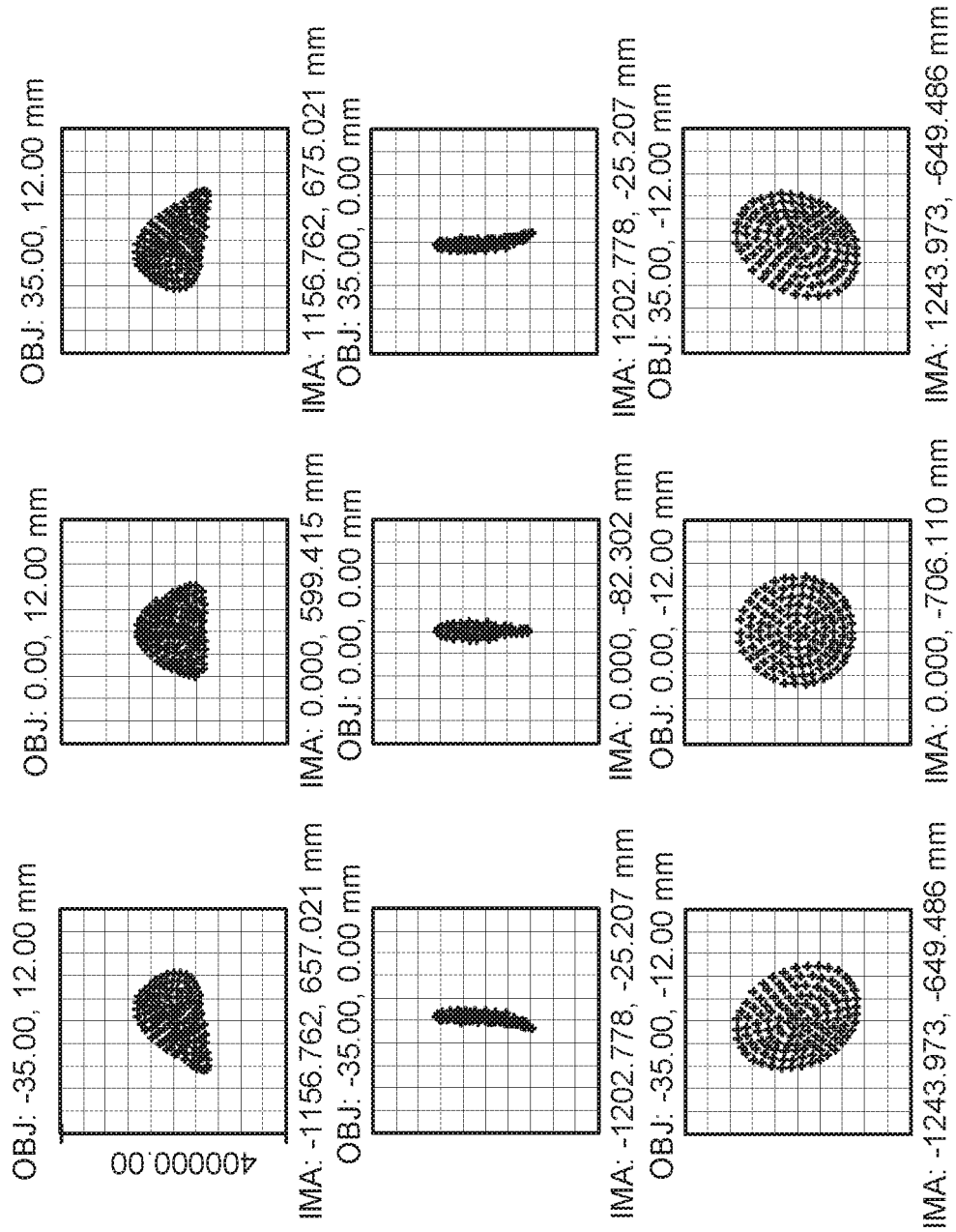
FIG. 24 shows a simulation of the HUD system according to an embodiment of the invention.
Figure 24B:
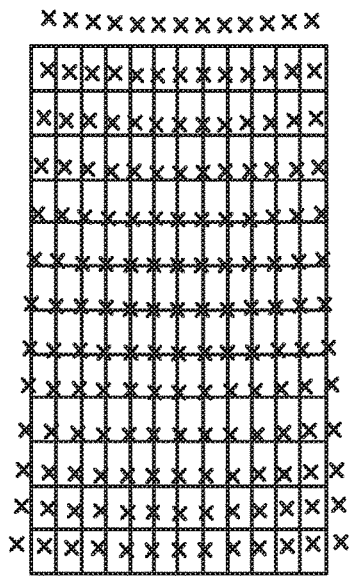

FIG. 22 shows an alternative embodiment identical to that of FIG. 19 save for the use of a cylindrical mirror 212 in place of the mirror 211 and cylindrical lens 221. Following the same principle as FIG. 19, the lens 220 is used to image a generated optical object which is then further imaged by the windscreen 201 to 20 meters away along the secondary direction. The cylindrical mirror 212 is then used to add optical power along the primary direction with impacts on the ghost image to match the 20 meters' projection distance along the primary direction to achieve ghost image free projection. 2D and 3D simulation results of the optical setup shown in FIG. 22 are depicted in FIGS. 23 and 24. As can be seen, though the use of a cylindrical mirror 212 can negatively impact the absolute distortion and overall image quality, it can reduce the achromatic dispersion in full colour images.

Accordingly, there is provided a HUD system 10 in accordance with an aspect of the invention.

The invention claimed is:

1. An image generation system for providing a ghost image free head-up display, the system comprising:
    a display screen having a front surface and a back surface said display screen having a first configuration,
    a picture generation unit for projecting an image towards the display screen for reflection towards a first predetermined eye box,
    and a field lens with a predetermined aperture size, the field lens being configured to alter a divergent beam from the picture generation unit to a near parallel beam,
    wherein the picture generation unit is configured to project light through the field lens such that light incident on the front surface of the display screen is collimated and forms a first virtual image, wherein a portion of the light is transmitted through the display screen and is incident on the back surface of the display screen forming a second virtual image, wherein the first and second virtual images have an offset,
    wherein the field lens is configured such:
    that the offset between the first and second virtual images incident on the front and back surfaces of the display screen is below a threshold magnitude and the first and second virtual images are substantially overlaid as viewed from the eye box,
    the offset between the first and second virtual image is below a threshold angular resolution, and
    the aperture size allows for the eye box to be larger than an inter pupil distance,
    wherein the picture generation unit and/or field lens are further configured to adjust the offset between the first and second virtual images when one of the configuration of the display screen or predetermined eye box has changed.

2. The image generation system of claim 1, wherein the first virtual image is projected onto a first virtual image plane at a first projection distance from the eye box and the second virtual image is projected onto a second virtual image plane at a second projection distance from the eye box.

3. The image generation system of claim 1, wherein the field lens is configured to project the first and second virtual images at the first and second projection distances such that the offset between the first and second virtual image is below a threshold angular resolution.

4. The image generation system of claim 3, wherein the threshold angular resolution is equal to the dimensions of a pixel.

5. The image generation system of claim 3, wherein the threshold angular resolution is equal to the angular resolution of the human eye.

6. The image generation system of claim 1, wherein the first and second virtual images are offset in a plane perpendicular to optical axis.

7. The image generation system of claim 1, wherein the field lens is provided by one of a concave mirror, a free-form surface, a Fresnel lens, a waveguide, a diffractive optical element, a holographic optical element or one or more tapered optical fibers.

8. The image generation system of claim 1, wherein the picture generation unit comprises a light source and a spatial light modulator.

9. The image generation system of claim 1, further comprising intervening optics between the picture generation unit and the field lens and/or the filed lens and the display screen.

10. The image generation system of claim 9, wherein the intervening optics comprise one of a fold mirror, cylindrical mirror, cylindrical lens, waveguide, diffractive optical element or holographic optical element.

11. The image generation system of claim 1, further comprising an image processor in communication with the picture generation unit, wherein the image processor is configured to account for distortions caused by the optical set up such that the images appears undistorted on the display screen.

12. The image generation system of claim 1, wherein the display screen of the head-up display is a windscreen of a vehicle.

13. The image generation system of claim 1, wherein the first and second virtual images relate to a first image of a stereoscopic pair of images.

14. The image generation system of claim 1, wherein one or more of the field lens, projection unit and/or intervening optical components (if present) are moveable relative to one another.

15. The image generation system of claim 1, wherein the first and second virtual images are multi-dimensional images.

16. The image generation system of claim 1, wherein the first and second virtual image comprise a subset of images, wherein each image of the subset is realised at a different distance from the focal length of the field lens such that when projected onto the display screen, each of image of the subset has a different apparent depth as viewed from the eye box.

17. The image generation system of claim 1, further comprising a light sensitive device arranged to capture light reflected by the display screen through the field lens.

18. A method for providing a ghost image free head-up display, the method comprising:
generating an image at a picture generation unit, said image to be rendered on a display screen for reflection towards a predetermined eye box, the display screen having a front surface and a back surface,
providing a field lens between the picture generation unit and the display screen,
wherein a portion of the light incident on the front surface of the display screen is reflected forming a first virtual image, and a portion of the light is transmitted through the display screen and is incident on the back surface forming a second virtual image offset from the first virtual image, and
configuring the field lens such that the offset between the first and second virtual images incident on the front and back surfaces of the display screen is below a threshold magnitude and the first and second virtual images are substantially overlaid as viewed from the eye box,
identifying a change in the eye box or display screen and adjusting the image generated at the picture generation unit and/or field such that the first and second virtual images are substantially overlaid as viewed from the eye box.

* * * * *